(12) United States Patent
Chintakindi et al.

(10) Patent No.: US 12,352,598 B2
(45) Date of Patent: *Jul. 8, 2025

(54) PERSONALIZED DRIVING RISK MODELING AND ESTIMATION SYSTEM AND METHODS

(71) Applicant: Allstate Insurance Company, Northbrook, IL (US)

(72) Inventors: Sunil Chintakindi, Menlo Park, CA (US); Anuradha Kodali, Fremont, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,850

(22) Filed: Feb. 13, 2023

(65) Prior Publication Data

US 2023/0273045 A1 Aug. 31, 2023

Related U.S. Application Data

(63) Continuation of application No. 17/085,679, filed on Oct. 30, 2020, now Pat. No. 11,578,990, which is a continuation of application No. 16/134,711, filed on Sep. 18, 2018, now Pat. No. 10,830,605, which is a continuation-in-part of application No. 15/802,639, (Continued)

(51) Int. Cl.
*G01C 21/36* (2006.01)
*G01C 21/34* (2006.01)

(52) U.S. Cl.
CPC ..... *G01C 21/3691* (2013.01); *G01C 21/3461* (2013.01); *G01C 21/3484* (2013.01)

(58) Field of Classification Search
CPC ............ G01C 21/3691; G01C 21/3461; G01C 21/3484

See application file for complete search history.

(56) References Cited

U.S. PATENT DOCUMENTS

| | | |
|---|---|---|
| 7,839,292 B2 | 11/2010 | Wang et al. |
| 8,725,403 B2 | 5/2014 | Aoki et al. |

(Continued)

FOREIGN PATENT DOCUMENTS

| | | |
|---|---|---|
| CN | 105261225 A | 1/2016 |
| DE | 102011084640 A1 | 4/2013 |

(Continued)

OTHER PUBLICATIONS

Dec. 9, 2016—(US) Notice of Allowance—U.S. Appl. No. 15/299,239, 9 pages.

(Continued)

*Primary Examiner* — Hussein Elchanti

(57) ABSTRACT

Systems and methods in accordance with aspects of this disclosure may be provided to determine and calculate an overall driving risk index value corresponding to a driver and scene configuration. The overall driving risk index value may provide driving risk modeling and estimation at a personalized driving level. In some cases, the overall driving risk index value may be determined using a risk-predictive modeling system with weighting and machine learning and may include one or more of: a driver score system, a driver-contextual risk score system, and a conflict index system.

17 Claims, 14 Drawing Sheets

Related U.S. Application Data filed on Nov. 3, 2017, now Pat. No. 10,132,644, which is a continuation of application No. 15/646,833, filed on Jul. 11, 2017, now Pat. No. 9,851,214, which is a continuation of application No. 15/296,915, filed on Oct. 18, 2016, now Pat. No. 9,739,627.

(56) References Cited

U.S. PATENT DOCUMENTS

| | | | |
|---|---|---|---|
| 8,924,240 B2 | 12/2014 | Depura et al. | |
| 9,050,045 B2 | 6/2015 | Mori | |
| 9,254,824 B2 | 2/2016 | Ko et al. | |
| 9,384,661 B1 | 7/2016 | DeLuca et al. | |
| 9,435,652 B2 | 9/2016 | Ralston et al. | |
| 9,495,874 B1* | 11/2016 | Zhu | B60W 60/00133 |
| 9,625,266 B1 | 4/2017 | Chintakindi | |
| 9,739,627 B1* | 8/2017 | Chintakindi | G01C 21/3691 |
| 9,851,214 B1* | 12/2017 | Chintakindi | G01C 21/3484 |
| 10,042,359 B1* | 8/2018 | Konrardy | B60W 40/04 |
| 10,132,644 B2* | 11/2018 | Chintakindi | G01C 21/3484 |
| 10,373,259 B1* | 8/2019 | Konrardy | G06Q 40/08 |
| 10,678,259 B1* | 6/2020 | Ferguson | G06T 7/74 |
| 10,739,160 B2 | 8/2020 | Chintakindi | |
| 10,830,605 B1* | 11/2020 | Chintakindi | G01C 21/3484 |
| 11,578,990 B1* | 2/2023 | Chintakindi | G01C 21/3691 |
| 2006/0235753 A1 | 10/2006 | Kameyama | |
| 2007/0124027 A1 | 5/2007 | Betzitza et al. | |
| 2008/0147319 A1* | 6/2008 | Cubillo | G01C 21/3874 |
| | | | 701/431 |
| 2010/0110105 A1 | 5/2010 | Kinnunen | G01C 21/3664 |
| | | | 345/629 |
| 2011/0087433 A1* | 4/2011 | Yester | G08G 1/096716 |
| | | | 701/469 |
| 2012/0059789 A1* | 3/2012 | Sakai | G08G 1/161 |
| | | | 706/52 |
| 2012/0313806 A1* | 12/2012 | Katoh | G01S 13/931 |
| | | | 342/52 |
| 2013/0194099 A1 | 8/2013 | Nagata | |
| 2013/0321401 A1 | 12/2013 | Piemonte et al. | |
| 2014/0257989 A1 | 9/2014 | Prakah-Asante et al. | |
| 2014/0277888 A1* | 9/2014 | Dastoor | B60L 3/12 |
| | | | 701/22 |
| 2015/0003087 A1* | 1/2015 | Futamura | B60Q 9/008 |
| | | | 362/466 |
| 2015/0053066 A1 | 2/2015 | Hampiholi et al. | |
| 2015/0170498 A1* | 6/2015 | Beggs | B60Q 1/2673 |
| | | | 340/686.6 |
| 2015/0170512 A1 | 6/2015 | Scofield | |
| 2015/0183369 A1 | 7/2015 | Fu | |
| 2015/0191122 A1 | 7/2015 | Roy et al. | |
| 2015/0211868 A1 | 7/2015 | Matsushita et al. | |
| 2016/0019434 A1* | 1/2016 | Caldwell | G06V 10/462 |
| | | | 345/474 |
| 2016/0089954 A1 | 3/2016 | Rojas Villanueva | |
| 2016/0137208 A1* | 5/2016 | Powers | G08G 1/096725 |
| | | | 701/36 |
| 2016/0154538 A1* | 6/2016 | Wang | G01C 21/3664 |
| | | | 715/771 |
| 2016/0189308 A1 | 6/2016 | Bogovich et al. | |
| 2016/0207540 A1 | 7/2016 | Liu et al. | |
| 2016/0209228 A1 | 7/2016 | Golding et al. | |
| 2017/0030726 A1 | 2/2017 | French et al. | |
| 2017/0176198 A1 | 6/2017 | Tatourian et al. | |
| 2017/0200449 A1 | 7/2017 | Penilla et al. | |
| 2017/0313324 A1 | 11/2017 | Kumai et al. | |
| 2018/0106633 A1 | 4/2018 | Chintakindi | |
| 2018/0126938 A1 | 5/2018 | Cordova et al. | |
| 2018/0290660 A1 | 10/2018 | Huang et al. | |
| 2019/0049261 A1 | 2/2019 | Colby | |

FOREIGN PATENT DOCUMENTS

| | | |
|---|---|---|
| DE | 102015108416 A1 | 12/2015 |
| DE | 102015200775 A1 | 7/2016 |
| EP | 1882619 A1 | 1/2008 |
| EP | 2489566 A2 | 8/2012 |
| EP | 3246892 A1 | 11/2017 |
| GB | 250662 A | 4/1926 |
| JP | 5362470 B2 | 12/2013 |
| KR | 101347980 B1 | 2/2014 |

OTHER PUBLICATIONS

Dec. 22, 2016—(US) Non-Final Office Action—U.S. Appl. No. 15/296,915, 8 pages.
Apr. 17, 2017—(US) Notice of Allowance—U.S. Appl. No. 15/296,915, 13 pages.
Jan. 13, 2017—(US) Notice of Allowance—U.S. Appl. No. 15/299,239, 7 Pages.
Sep. 1, 2017—(US) Notice of Allowance—U.S. Appl. No. 15/646,833, 14 pages.
Aug. 15, 2018—(US) Notice of Allowance—U.S. Appl. No. 15/802,639, 5 pages.
Mar. 30, 2018—(US) Non-Final Office Action—U.S. Appl. No. 15/802,639, 16 pages.
Apr. 9, 2020—(US) Notice of Allowance—U.S. Appl. No. 16/193,581, 15 pages.
Jul. 15, 2020—(US) Notice of Allowance—U.S. Appl. No. 16/134,711, 8 pages.
Mar. 24, 2020—(US) Non-Final Office Action—U.S. Appl. No. 16/134,711, 16 pages.
Feb. 22, 2021—(US) Non-Final Office Action—U.S. Appl. No. 16/922,366, 10 pages.
Mar. 31, 2021—Notice of Allowance—U.S. Appl. No. 16/922,366, 5 pages.
Mar. 19, 2021—Final Office Action—U.S. Appl. No. 16/922,366, 14 pages.
Apr. 18, 2022—(US) Non-Final Office Action—U.S. Appl. No. 17/080,367, 15 Pages.
Grey E.M., et al., "Driver Aggression: the Role of Personality, Social Characteristics, Risk and Motivation," Transport and Communications, Mar. 1989, Retrieved on Dec. 7, 2017, 90 pages.
Hennessy D.A., et al., Traffic Congestion, Driver Stress, and Driver Aggression, Agressive Behavior, 1999, vol. 25, pp. 409-423, 17 pages.
International Preliminary Report on Patentability for International Application No. PCT/US2017/057144, mailed May 2, 2019, 14 Pages.
International Search Report and Written Opinion for International Application No. PCT/US2017/057144, mailed Jan. 18, 2018, 16 Pages.
International Search Report and Written Opinion of The International Searching Authority for International Application No. PCT/IB2021/059836 dated Jan. 27, 2022 (14 pages).
Pan (Susan) J., et al., "Proactive Vehicle Re-Routing Strategies for Congestion Avoidance," May 16, 2012, 8 pages.
Quddus M.A., et al., "A General Map Matching Algorithm for Transport Telematics Applications," GPS Solutions, Loughborough University 2003, vol. 7 (3), Dec. 7, 2017, pp. 157-167.
Tarantilis C.D., et al., "Using a Spatial Decision Support System for Solving the Vehicle Routing Problem," Information & Management, 2002 Vol. 39, Retrieved from URL: https://s3.amazonaws.com/academia.edu.documents/31845412/5046351af6b0addfc4.pdfAWSAccessKeyId=AKIAIW on Dec. 7, 2017, pp. 359-375.
Jan. 22, 2024—(US) Non-Final Office Action—U.S. Appl. No. 17/080,367, 17 Pages.
Jun. 9, 2023—(US) Final Office Action—U.S. Appl. No. 17/080,367, 14 Pages.
Mar. 3, 2023—(US) Non-Final Office Action—U.S. Appl. No. 17/080,367, 12 Pages.

* cited by examiner

PERSONALIZED DRIVING RISK MODELING AND ESTIMATION SYSTEM AND METHODS

CROSS REFERENCE TO RELATED APPLICATIONS

This application is a continuation to patent application Ser. No. 17/085,679, entitled "Personalized Driving Risk Modeling and Estimation System and Methods" that was filed on Oct. 30, 2020, which is a continuation to patent application Ser. No. 16/134,711, entitled "Personalized Driving Risk Modeling and Estimation System and Methods" that was filed on Sep. 18, 2018, which is a continuation-in-part to patent application Ser. No. 15/802,639 entitled "Road Frustration Index Risk Mapping and Mitigation" that was filed on Nov. 3, 2017, which is a continuation of patent application Ser. No. 15/646,833 entitled "Road Frustration Index Risk Mapping and Mitigation" that was filed on Jul. 11, 2017, which is a continuation of patent application Ser. No. 15/296,915 entitled "Road Frustration Index Risk Mapping and Mitigation" that was filed on Oct. 18, 2016 (now U.S. Pat. No. 9,739,627), and is related to patent application Ser. No. 15/299,239 entitled "Road Frustration Index Risk Mapping and Mitigation", which is also a continuation of patent application Ser. No. 15/296,195 and issued on Apr. 18, 2017 as U.S. Pat. No. 9,625,266. Each of these applications is incorporated by reference in their entireties herein.

TECHNICAL FIELD

Aspects of this disclosure relate generally to risk estimation. More particularly, aspects of this disclosure relate to a risk-predictive framework for driving using driving behaviors and driving reactions using one or more of three different indicators of risk: driver score, driver-contextual score, and conflict index.

BACKGROUND

Driver profiling is shifting from traditional driver characteristics to driving attributes for control system modeling. Understanding driver behaviors in risk-context and the corresponding driving sensitivity to the contextual environment is important for risk modeling and crash causation. There is a need for modeling risk predictive behaviors for dangerous driver behaviors and the corresponding risk scene environment. The driving risk modeling and estimation systems and methods can be helpful for controlling vehicle, coaching drivers, and warning drivers that interact with other human drivers on the road in autonomous, semi-autonomous, or traditional vehicle control systems in the vehicles.

Additionally, these driver behavior-based profiles can be used for insurance purposes. Driver behavior-based profiling can be effective for providing and determining accurate personalized insurance premiums, driver coaching, rewarding safe drivers, designing driver-system handoff in semi-autonomous vehicles, and autonomous systems or advanced driver-assistance system (ADAS).

SUMMARY

Aspects of this disclosure overcome problems and limitations of the prior art by providing systems and methods to identify driver behaviors crucial for risk-prediction and learn driver behaviors, such as for driver coaching and/or insurance premiums or with autonomous or ADAS systems. Additionally, the systems and methods may help identify how driver behaviors and risk reactions play in the context of scene configuration affecting crash causation and identifying a catalog of risk scenes and driving behaviors. Identifying irregular pattern driving, risky acceleration, hard braking, following vehicles, and lane changes, etc. even during regular driving may be important as these attributes indicate risky driving and are proved to correlate with actual crashes. Similarly, a catalog of high-risk contextual scenes may be useful to identify dangerous cliques by involving driving behaviors, thereby personalizing to the driver-level. This dataset profiling or scoring and bookkeeping of scenes can accommodate multiple applications in autonomous, intelligent transportation, traffic safety, and the insurance context.

For autonomous applications, this modeling may be extended into two areas: design of control systems (e.g. advanced driver-assistance systems—ADAS) to mimic driving; and a context, driver-system handoff problem as seen in level 3 and level 4 autonomous vehicles for control-shift between human and machine. Importantly, this risk modeling and estimation as disclosed herein is crucial when autonomous vehicles are interacting with regular human drivers sharing the same road. Additionally, the knowledge of the environment and the driver's influence on risk is important while constructing intelligent transport systems with smart city infrastructure especially for fleet management like Robo taxis.

Insurance's conventional approach of determining premiums via driver characteristic factors that are expected to impact future costs is changing fast to include driving with contextual information for reflection of current times. Usage-based insurance is one step towards that direction with "pay as you drive" (PAYD) schemes. With the inclusion of tracking driver behaviors, it can be possible for "pay how you drive" (PHYD) mechanisms. These mechanisms may be as personalized as possible with setting the premium, rewarding safe drivers and providing driver coaching information to the driver.

Various approaches to driving risk modeling and estimation are presented. In accordance with aspects of this disclosure, a risk-predictive modeling system for providing driving risk modeling and estimation may comprise: one or more vehicle operation sensors configured to record vehicle telematics data from a vehicle associated with a driver; one or more frustration sensors configured to record frustration information indicating a current level of the driver of the vehicle; and one or more telematics devices configured to transmit the recorded vehicle telematics data from the vehicle to a processor. The processor and a memory unit storing computer-executable instructions, which when executed by the processor, may cause the processor to: receive the vehicle telematics data from the one or more telematics devices corresponding to the driver; identify and count one or more driving behaviors from the vehicle telematics data; calculate and determine a driving behavior score dataset from the counted one or more driving behaviors from the vehicle telematics data; calculate and determine a risk-exposure score dataset and a risk map from a historical database storing accident information, traffic data, vehicle volume data, vehicle density data, road characteristic data, or weather data; calculate and determine a driver-risk score dataset based on a weighted average of the driving behavior score dataset and the risk-exposure score dataset; receive factors and characteristics for the driver for a driver characteristics dataset; calculate and determine, using weighting and machine learning, a driver score dataset associated with the driving behavior score dataset, the risk-exposure score dataset, the driver-risk score dataset, and the driver characteristics dataset; calculate and determine a contextual information dataset from one or more of weather data, infrastructure data, traffic data, and vehicle characteristics; receive frustration information from the one or more frustration sensors indicating a level of frustration of the driver; calculate and determine a road frustration index dataset from the frustration information and the level of frustration of the driver; receive real-time vehicle telematics data from the one or more telematics devices corresponding to the driver; identify and count one or more real-time driving behaviors from the real-time vehicle telematics data; calculate and determine a current driving behavior score dataset from the counted one or more real-time driving behaviors from the real-time vehicle telematics data; calculate and determine a trip dynamics dataset based on the real-time vehicle telematics data corresponding to a trip and a time and distance remaining for the trip; calculate and determine, using weighting and machine learning, a real-time driver score dataset associated with the current driving behaviors dataset, the driver score dataset, and the trip dynamics dataset; calculate and determine, using weighting and machine learning, a driver-contextual risk score dataset associated with the contextual information dataset, the road frustration index dataset, and the real-time driver score dataset; calculate and determine a contextual response score dataset that includes scene-configuration information and contextual information of a scene; calculate and determine, using weighting and machine learning, a risk-response readiness dataset associated with the driver-risk score dataset, the driver-contextual risk score dataset, and the road frustration index dataset; and calculate and determine, using weighting and machine learning, a conflict index dataset associated with the contextual response score dataset and the risk-response readiness dataset. An overall driving risk index value may then be determined using the risk-predictive modeling system and includes the driver score dataset, the driver-contextual risk score dataset, and the conflict index dataset.

In accordance with other aspects of this disclosure, a method for providing driving risk modeling and estimation may comprise the following steps: receive, by a processor and a memory unit storing computer-executable instructions connected to one or more telematics devices, scene-configuration information and contextual information of a scene; calculate and determine, by a conflict index system that includes a conflict index engine connected to the processor, a contextual response score dataset that includes the scene-configuration information and the contextual information of the scene; calculate and determine, by the conflict index engine using weighting and machine learning, a risk-response readiness dataset associated with a driver-risk score dataset based on the vehicle telematics data and a risk map of a route, a driver-contextual risk score dataset based on a real-time telematics data, and a road frustration index dataset based on a frustration level of the driver, wherein the risk-response readiness dataset includes an index of how a set of driving behaviors plus scene-configuration effects a driver's reactions; and calculate and determine, by the conflict index engine using weighting and machine learning, a conflict index dataset associated with the contextual response score dataset and the risk-response readiness dataset. Further, an overall driving risk index value may be determined using a risk-predictive modeling system and includes a driver score dataset, the driver-contextual risk score dataset, and the conflict index dataset. Further, the one or more telematics devices may be configured to transmit recorded vehicle telematics data from a vehicle to the processor. The scene-configuration information and the contextual information may include one or more of the following: a number of autonomous vehicles, a number of human drivers, a set of pedestrians or others in the scene, a risk map, a number of total vehicles, lane dynamics of the scene, and traffic dynamics of the scene.

In accordance with other aspects of this disclosure, a risk-predictive modeling system for providing driving risk modeling and estimation that may comprise: one or more vehicle operation sensors configured to record vehicle telematics data from a vehicle associated with a driver; one or more telematics devices configured to transmit the recorded vehicle telematics data from the vehicle to a processor; and a conflict index system that includes a conflict index engine connected to the processor. The processor and a memory unit storing computer-executable instructions, which when executed by the processor, may cause the processor to: receive, by the conflict index engine, scene-configuration information and contextual information of a scene; calculate and determine, by the conflict index engine, a contextual response score dataset that includes scene-configuration information and contextual information of a scene; calculate and determine, by the conflict index engine using weighting and machine learning, a risk-response readiness dataset associated with a driver-risk score dataset based on the vehicle telematics data and a risk map of a route, a driver-contextual risk score dataset based on a real-time telematics data, and a road frustration index dataset based on a frustration level of the driver, wherein the risk-response readiness dataset includes an index of how a set of driving behaviors plus scene-configuration effects a driver's reactions; and calculate and determine, by the conflict index engine using weighting and machine learning, a conflict index dataset associated with the contextual response score dataset and the risk-response readiness dataset. Further, an overall driving risk index value may be determined using the risk-predictive modeling system and includes a driver score dataset, the driver-contextual risk score dataset, and the conflict index dataset. Further, wherein the scene-configuration information and the contextual information includes one or more of the following: a number of autonomous vehicles, a number of human drivers, a set of pedestrians or others in the scene, a risk map, a number of total vehicles, lane dynamics of the scene, and traffic dynamics of the scene.

The details of these and other embodiments of this disclosure are set forth in the accompanying drawings and description below. Other features and advantages of aspects of this disclosure will be apparent from the description and drawings.

BRIEF DESCRIPTION OF THE DRAWINGS

Aspects of this disclosure may take physical form in certain parts and steps, embodiments of which will be described in detail in the following description and illustrated in the accompanying drawings that form a part hereof, wherein.

Figure 1A:
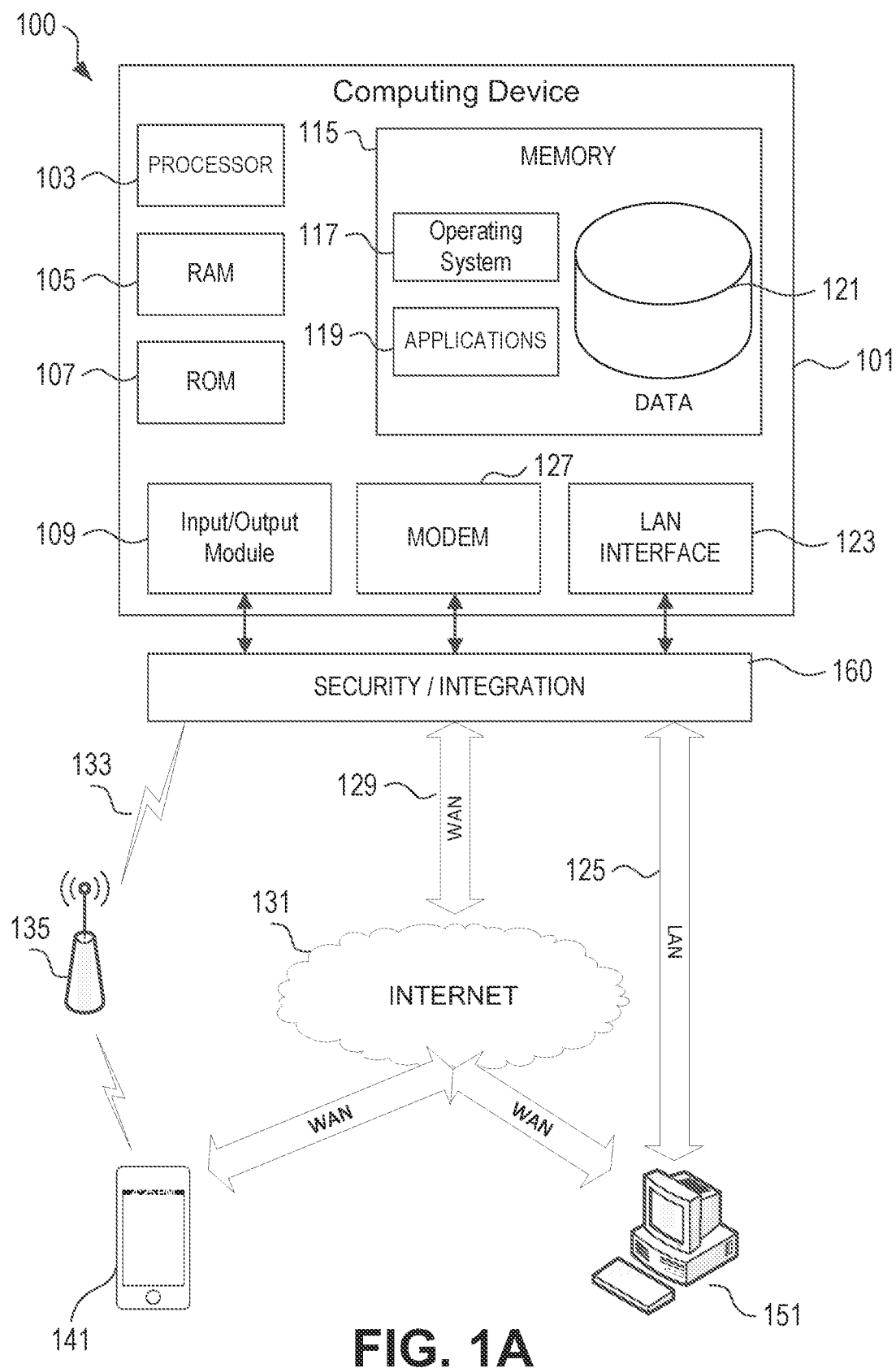
FIGS. 1A and 1B depict illustrative block diagrams of operating environments in accordance with aspects of this disclosure.

It will be apparent to one skilled in the art after review of the entirety disclosed that the steps illustrated in the figures listed above may be performed in other than the recited order, and that one or more steps illustrated in these figures may be optional.

DETAILED DESCRIPTION

Systems and methods in accordance with aspects of this disclosure may be provided to determine and calculate an overall driving risk index value corresponding to a driver and scene configuration. The overall driving risk index value may provide driving risk modeling and estimation. In some cases, the overall driving risk index value may be determined using a risk-predictive modeling system with weighting and machine learning and may include one or more of: a driver score system, a driver-contextual risk score system, and a conflict index system. In some cases, the driving risk index value may be provided to a user, such as by creating a map reflecting an associated driving risk index value for a plurality of road segments along a driving route. Such a map may be generated using information received from a vehicle associated with the user regarding at least a vehicle speed. In some cases, the overall driving risk index value may be generated local to the driver, such as on a computing device located in the vehicle (e.g., a vehicle computing system, a mobile phone, a laptop computer, etc.) In some cases, the overall driving risk index value may be generated local to the driver, such as on a computing device remotely located from the vehicle, such as at a business organization computing system (e.g., an insurance agency computing system).

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, and entirely software embodiment, or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1A illustrates a block diagram of a computing device (or system) 100 (e.g., a driving risk modeling and estimation system) in a networked environment and/or computer system 100 (e.g., driving risk computing system) that may be used according to one or more illustrative embodiments of the disclosure. The computing device 101 may have a processor 103 for controlling overall operation of the computing device 101 and its associated components, including one or more memory units (e.g., RAM 105, ROM 107), an input/output module 109, and a memory 115. The computing device 101, along with one or more additional devices (e.g., terminals 141 and 151, security and integration hardware 160) may correspond to any of multiple systems or devices.

The input/output (I/O) 109 may include one or more user interfaces, such as a microphone, a keypad, one or more buttons, one or more switches, a touch screen, a stylus, one or more pressure sensors, one or more biometric sensors, and/or one or more other sensors (e.g., an accelerometer, a gyroscope, etc.) through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the system 101 to execute a series of computer-readable instructions, for example, to determine a driver score dataset, a driver-contextual risk score dataset, and a conflict index dataset. In some cases, the processor 103 and its associated components may allow the system 101 to execute a series of computer-readable instructions, for example, to determine, using weighting and machine learning, a driver score dataset associated with a driving behavior score dataset, a risk-exposure score dataset, a driver-risk score dataset, and a driver characteristics dataset. In some cases, the instructions may be configured to cause the processor 103 to determine, using weighting and machine learning, a driver-contextual risk score dataset associated with a real-time driver risk score dataset, a contextual information dataset, and a road frustration index dataset. In other cases, the instructions may be configured to cause the processor 103 to determine, using weighting and machine learning, a conflict index dataset associated with a risk-response readiness dataset and a contextual response score dataset.

The computing device 101 (e.g., a customer terminal, an insurance provider computer hardware memory and processor system, an insurance clearinghouse computer memory and processor device, etc.) may operate in a networked environment 100 supporting connections to one or more remote computers, such as terminals 141 and 151. The terminals 141 and 151 may be personal computers, servers (e.g., web servers, database or dataset servers), or mobile communication devices (e.g., mobile phones, portable computing devices, vehicles, and the like), and may include some or all of the elements described above with respect to the computing device 101. In some cases, the terminals 141, 151 may be located at one or more different geographic locations, including, but not limited to, at a customer location, a site associated with an insurance agent and/or agency and/or a site associated with an insurance provider. The network connections depicted in FIG. 1A include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless network 133.

Also illustrated in FIG. 1A is a security and integration layer 160, through which communications may be sent and managed between the computing device 101 and the remote devices (141 and 151) and remote networks (125, 129, and 133). The security and integration layer 160 may comprise one or more computing devices, such as web servers, authentication servers, and various networking components (e.g., firewalls, routers, gateways, load balancers, etc.), having some or all of the elements described above with respect to the computing device 101. As an example, security and integration layer 160 may comprise a set of web application servers configured to use secure protocols and to insulate the computing device 101 (e.g., one or more servers, a workstation, etc.) from external devices 141 and 151. In some cases, the security and integration layer 160 may correspond to a set of dedicated hardware and/or software operating at the same physical location and under the control of same entities as the computing device 101. For example, the layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from computing device 101 in may include secure and sensitive data, such as historical vehicle location information, real-time vehicle location and/or status information, insurance customer and policy data, etc. Therefore, it may be desirable to protect the data transmission by using secure network protocols and encryption, and also to protect the integrity of the data stored when on the computing device 101 using the security and integration layer 160 to authenticate users and restrict access to unknown or unauthorized users. In various implementations, security and integration layer 160 may provide, for example, a file-based integration scheme or a service-based integration scheme. In file-based integration, data files may be transmitted to and from the computing device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the computing device 101 and/or security and integration layer 160. The web services may be accessed by authorized external devices and users to support input, extraction, and manipulation of the data in the computing device 101. Web services built to support the system 100 may be cross-domain and/or cross-platform, and may be built for enterprise use. Such web services may be developed in accordance with various web service standards, such as the Web Service Interoperability (WS-I) guidelines. In some examples, system web service may be implemented in the security and integration layer 160 using the Secure Sockets Layer (SSL) or Transport Layer Security (TLS) protocol to provide secure connections between the computing device 101 and various clients 141 and 151 attempting to access, insert and/or manipulate data within the system 100. SSL or TLS may use HTTP or HTTPS to provide authentication and/or confidentiality. In some cases, system web service may be implemented using the WS-Security standard, which provides for secure SOAP messages using XML, encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1A, various elements within the memory 115 or other components in the system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, Bluetooth, WiMAX, etc., is presumed, and the various computer devices and insurance clearinghouse system components described herein may be configured to communicate using any of these network protocols or technologies.

Additionally, one or more application programs 119, such as a driving risk predictive application, may be used by one or more computing devices (e.g., the computing device 101) within the system 100, including computer executable instructions for identifying a driving risk predictive index being experienced by a driver (or owner, passenger, parent of the driver, etc.) of a vehicle in near real-time, predicting one or more road segments upon which the driver may experience some level of road frustration, generating a road frustration index value associated with the driver corresponding to a driving speed on a road segment having an associated road classification type, and generating one or more travel routes each predicted to have an associated road frustration index value based on information received from a plurality of drivers.

Figure 1B:
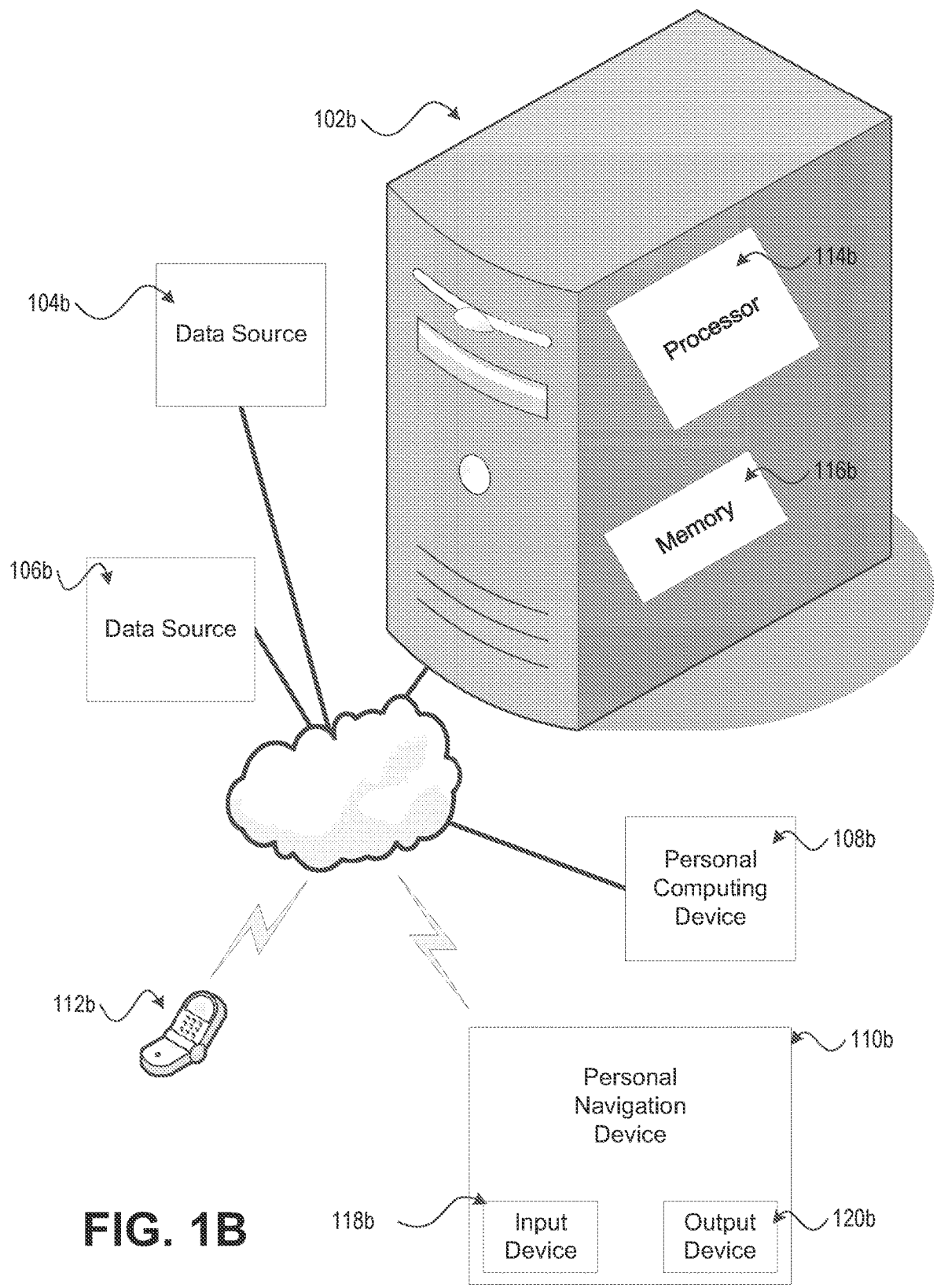

Referring to FIG. 1B, an example of a suitable operating environment in which various aspects of this disclosure may be implemented is shown in the architectural diagram of FIG. 1B. The operating environment is only one example of a suitable operating environment and is not intended to suggest any limitation as to the scope of use or functionality of this disclosure. The operating environment may be comprised of one or more data sources 104b, 106b in communication with a computing device 102b. The computing device 102b may use information communicated from the data sources 104b, 106b to generate values that may be stored in a conventional database format. In one embodiment, the computing device 102b may be a high-end server computer with one or more processors 114b and memory 116b for storing and maintaining the values generated. The memory 116b storing and maintaining the values generated need not be physically located in the computing device 102b. Rather, the memory (e.g., ROM, flash memory, hard drive memory, RAID memory, etc.) may be located in a remote data store (e.g., memory storage area) physically located outside the computing device 102b, but in communication with the computing device 102b.

A personal computing device 108b (e.g., a personal computer, tablet PC, handheld computing device, personal digital assistant, mobile device, etc.) may communicate with the computing device 102b. Similarly, a personal navigation device 110b (e.g., a global positioning system (GPS), geographic information system (GIS), satellite navigation system, mobile device, other location tracking device, etc.) may communicate with the computing device 102b. The communication between the computing device 102b and the other devices 108b, 110b may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102b and other devices (e.g., devices 108b, 110b) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In an illustrative example in accordance with aspects of this disclosure, a personal navigation device 110b may operate in a stand-alone manner by locally storing some of the database of values stored in the memory 116b of the computing device 102b. For example, a personal navigation device 110b (e.g., a GPS in an automobile) may be comprised of a processor, memory, and/or input devices 118b and/or output devices 120b (e.g., keypad, display screen, speaker, etc.). The memory may be comprised of a non-volatile memory that stores a database of values used in calculating an overall driving risk index value.

In yet another embodiment in accordance with aspects of this disclosure, a personal computing device 108b may operate in a stand-alone manner by locally storing some of the database of values stored in the memory 116b of the computing device 102b. For example, a personal computing device 108b may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated overall driving risk index value. If desired, the personal computing device 108b may be provided with an updated database of values (e.g., in the form of updated CD-ROM media) after a period of time. One skilled in the art will appreciate that personal computing device 108b, 110b, 112b need not be personal to a single user; rather, they may be shared among members of a family, company, etc.

The data sources 104b, 106b may provide information to the computing device 102b. In one embodiment in accordance with aspects of this disclosure, a data source may be a computer which contains memory storing data and is configured to provide information to the computing device 102b. Some examples of providers of data sources in accordance with aspects of this disclosure include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of this disclosure, access to the information in the data sources 104b, 106b may be restricted to only authorized computing devices 102b and for only permissible purposes. For example, access to the data sources 104b, 106b may be restricted to only those persons/entities that have signed an agreement (e.g., an electronic agreement) acknowledging their responsibilities with regard to the use and security to be accorded this information.

Figure 2:
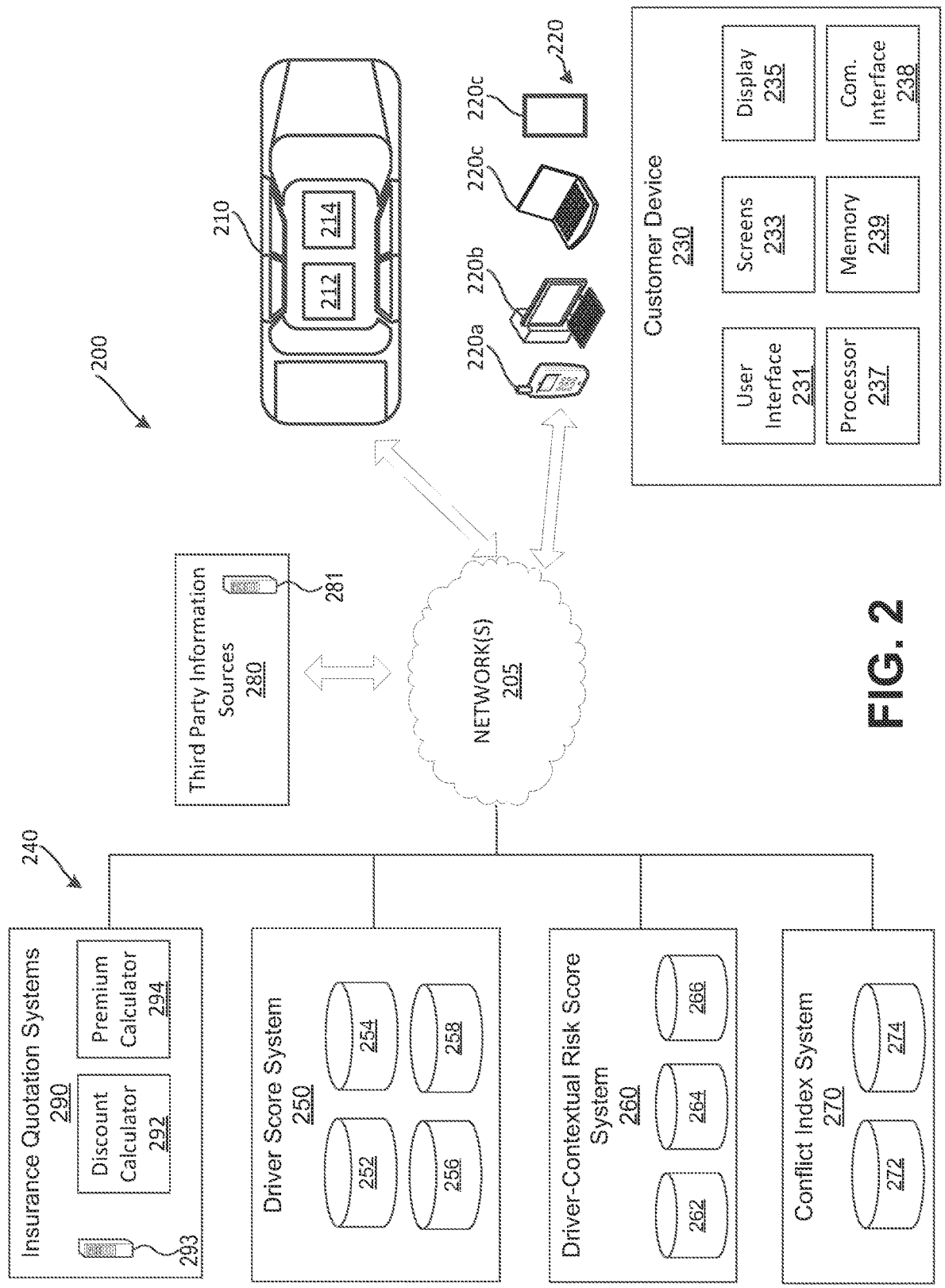
FIG. 2 shows an illustrative operating environment in accordance with aspects of this disclosure.

FIG. 2 shows an illustrative block diagram of a system 200 for generating and using an overall driving risk index value that may be used by one or more users in accordance with aspects of this disclosure. The system 200 may include a vehicle 210, one or more user devices 220 associated with a user (e.g., a driver, etc.) of the vehicle 210, and a risk-predictive modeling system 240 that may be associated with a business entity (e.g., an insurance provider, a vehicle manufacturer, a global positioning company, etc.) or governmental agency having an interest in assessing and/or minimizing a level of frustration being experienced by a driver when travelling on one or more segments of road upon which the user travels within the vehicle. The one or more user devices 220 may include a variety of personal computing devices including, but not limited to, a phone (e.g., a smart phone 220a), a personal computer 220b, a laptop computer 220c, a tablet computer 220d, a personal navigation device 110b, a vehicle's computer system, and/or the like. In some cases, the user devices 220 may comprise the illustrative user device 230 that may include a user interface 231 that may be capable of displaying one or more user interface screens 233 on a display device 235. The user interface screens 233 may include screens for displaying information to the user and/or receiving information from the user. The user device 230 may further include a processor 237, one or more memory devices 239 and a communication interface 238. In some cases, one or more of the user interface 231, the user interface screens 233, the display device 235, the processor 237, the one or more memory devices 239, and/or the communication interface 238 may be implemented similarly to the corresponding features discussed in reference to FIGS. 1A and 1B.

In some cases, one or more devices associated with the user and/or vehicle 210 may communicate via one or more wired or wireless networks 205 to the risk-predictive modeling system 240. For example, the risk-predictive modeling system 240 may include one or more of a driver score system 250, a driver-contextual risk score system 260, a conflict index system 270, and/or an insurance quotation system 290. To calculate and determine an overall driving risk index value, one or more of the driver score system 250, the driver-contextual risk score system 260, and the conflict index system 270 may access, via the wired or wireless networks 205, one or more computer systems 281 associated with a plurality of third-party information sources 280. Illustrative examples of third-party data sources may include the one or more data sources 104b, 106b discussed above. The insurance quotation system 290 may include one or more of an insurance quotation server 293, a discount calculator 292, and/or a premium calculator 294. Further, one or more devices within the insurance quotation system 290, the third party information sources 280, the driver score system 250, the driver-contextual risk score system 260, and/or the conflict index system 270 may be implemented using computing devices (e.g., the computing device 101, 102a, etc.) discussed in reference to FIGS. 1A and 1B.

Figure 4:
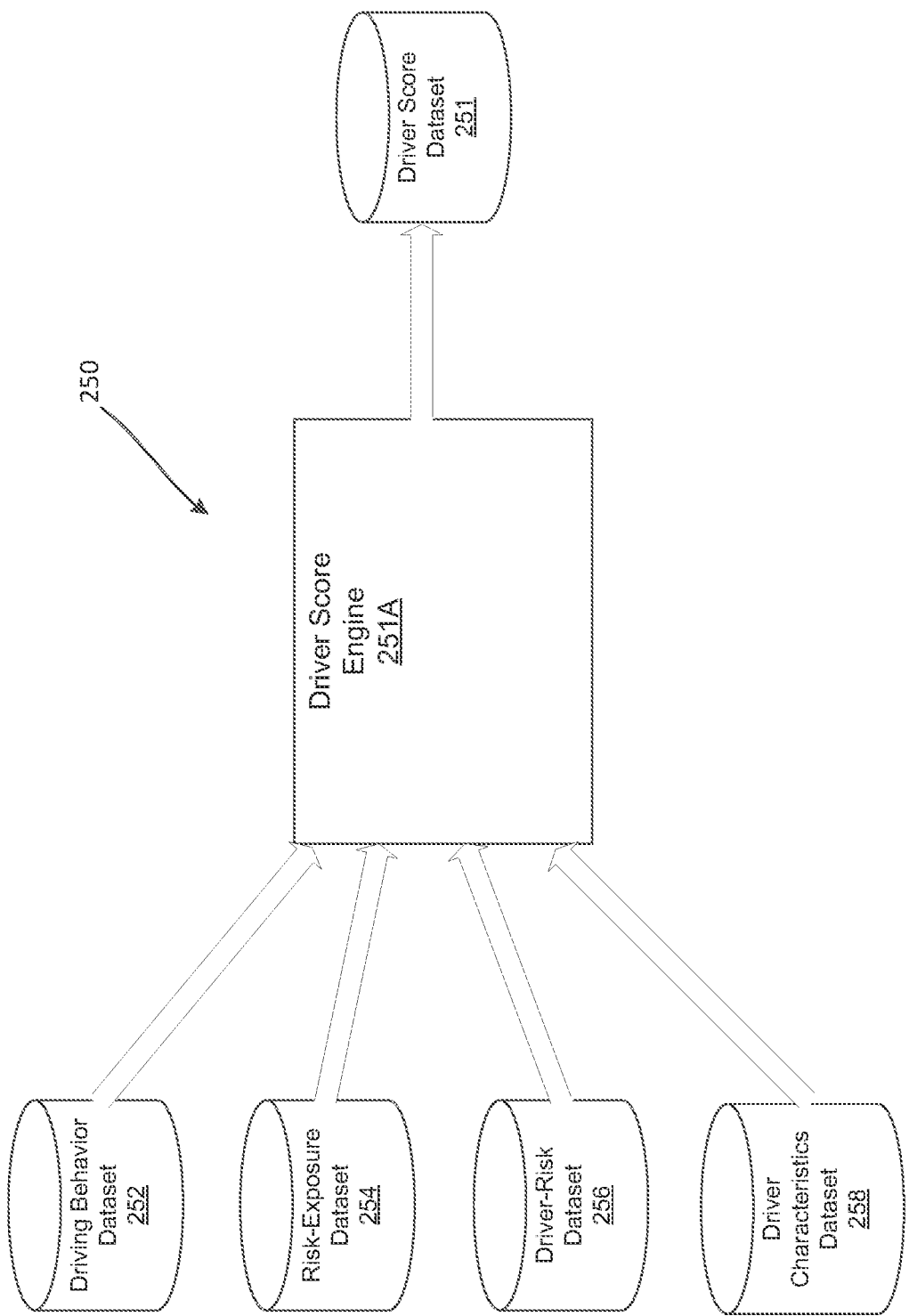
FIG. 4 shows an illustrative block diagram representation of a driver score system according to aspects of this disclosure.

In an illustrative example and as illustrated in FIG. 4, the driver score system 250 may be configured to identify and determine a driver score dataset 251. The driver score system 250 may utilize a driving behavior score dataset 252, a risk-exposure dataset 254, a driver-risk score dataset 256, and a driver characteristics dataset 258. In some cases, the driver score system 250 may include a driver score engine 251A configured to generate driver score datasets 251 and information associated with customers of the business organization. The driver score system 250 and the driver score engine 251A may utilize machine learning and weighted equation modeling with the inputs of the driving behavior score dataset 252, the risk-exposure dataset 254, the driver-risk score dataset 256, and the driver characteristics dataset 258 to generate the driver score datasets 251. The driver score engine 251A may utilize information received from the driving behavior score dataset 252, the risk-exposure dataset 254, the driver-risk score dataset 256, the driver characteristics dataset 258, and one or more remote devices associated with the user (e.g., the vehicle 210, the user interface device 212, the input device 214, and the user devices 220, 230) via the one or more networks. The driving behavior score dataset 252 may be tracked at all times.

Figure 5A:
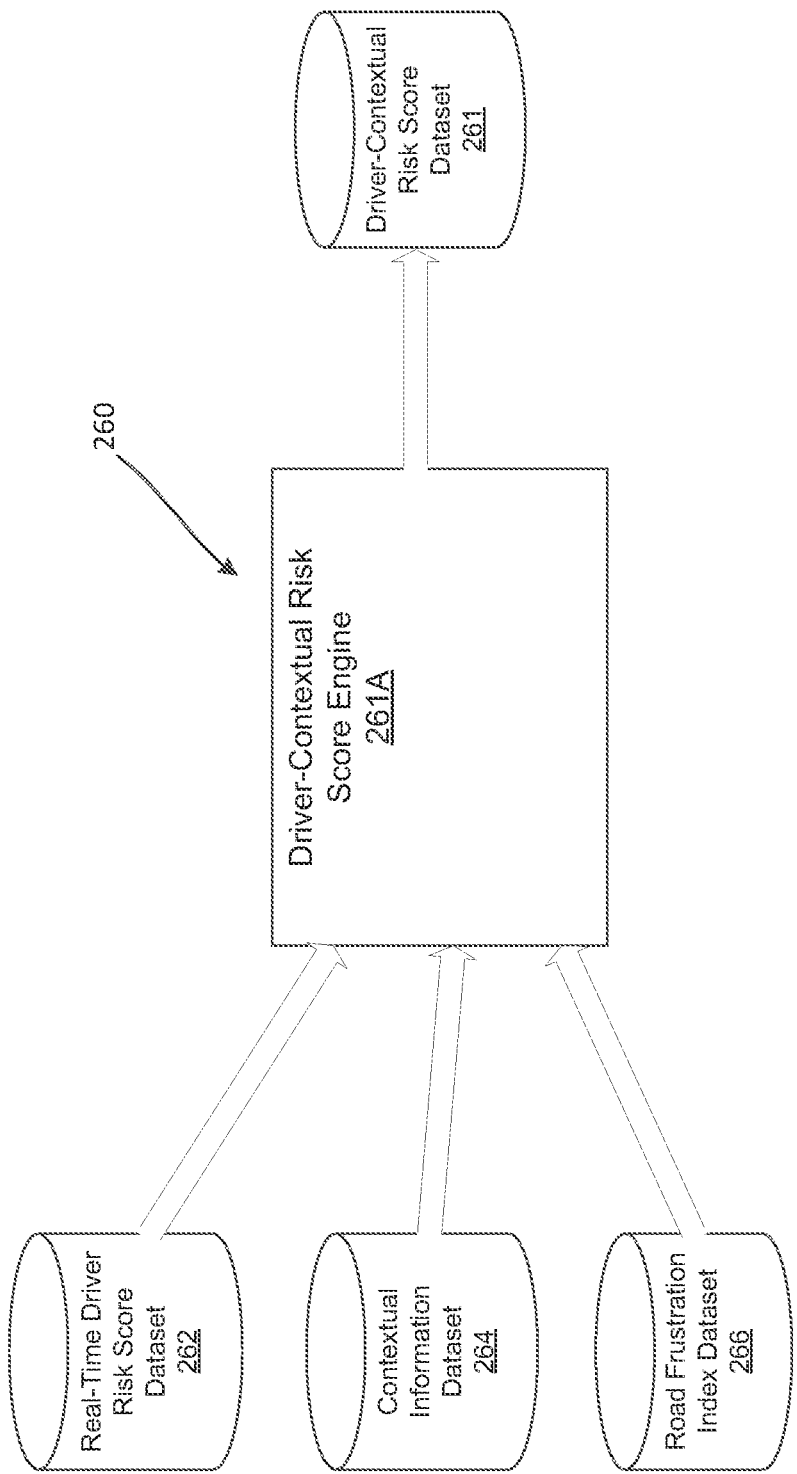
FIG. 5A shows an illustrative block diagram representation of a driver-contextual risk score system according to aspects of this disclosure.

In an illustrative example and as illustrated in FIG. 5A, the driver-contextual risk score system 260 may be configured to identify and determine a driver-contextual risk score dataset 261. The driver-contextual risk score system 260 may utilize a real-time driver risk score dataset 262, a contextual information dataset 264, and a road frustration index dataset 266. In some cases, the driver-contextual risk score system 260 may include a driver-contextual risk score engine 261A configured to generate driver-contextual risk score datasets 261 and information associated with customers of the business organization. The driver-contextual risk score system 260 and the driver-contextual risk score engine 261A may utilize machine learning and weighted equation modeling with the inputs of the real-time driver risk score dataset 262, the contextual information dataset 264, and the road frustration index dataset 266 to generate the driver-contextual risk score datasets 261. The driver-contextual risk score engine 261A may utilize information received from the real-time driver risk score dataset 262, the contextual information dataset 264, the road frustration index dataset 266, and one or more remote devices associated with the user (e.g., the vehicle 210, the user interface device 212, the input device 214, and the user devices 220, 230) via the one or more networks.

Figure 6A:
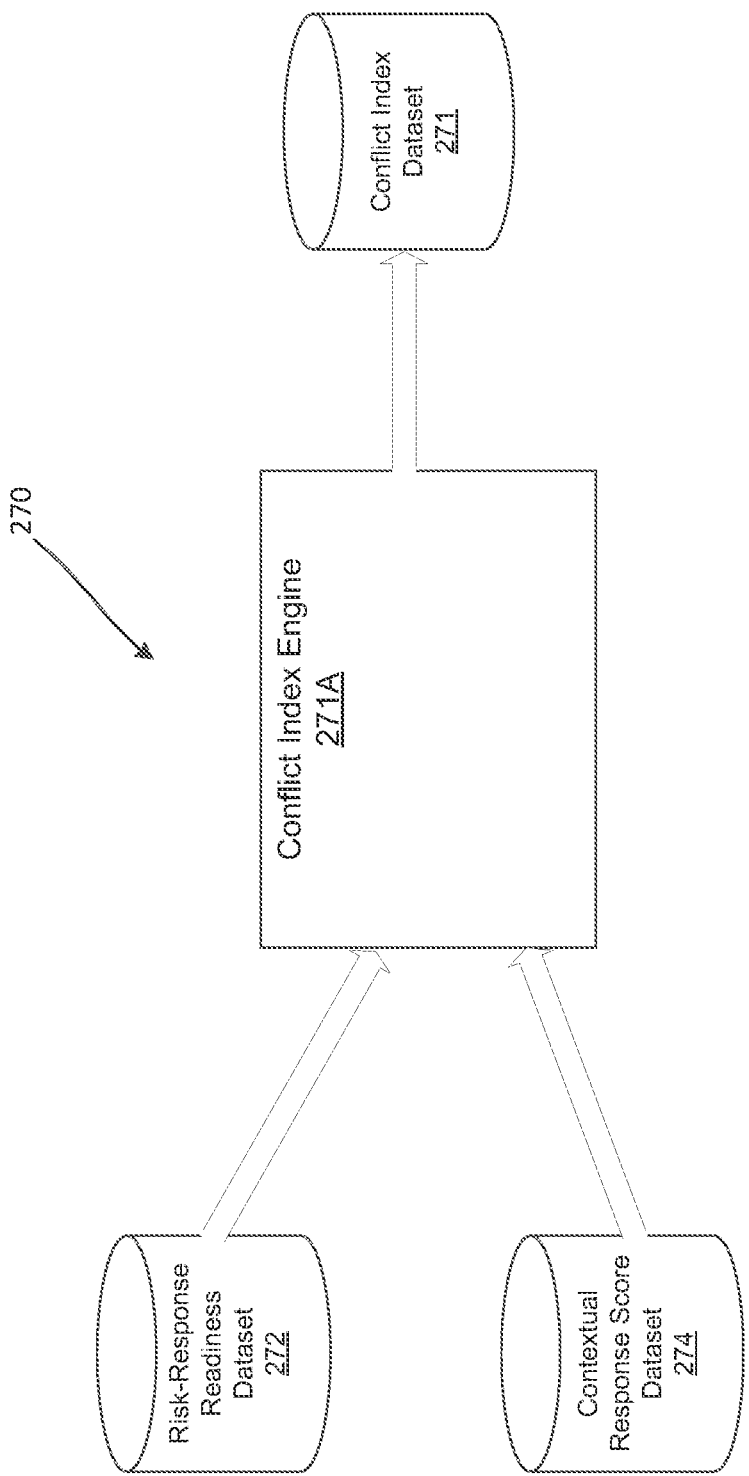
FIG. 6A shows an illustrative block diagram representation of a conflict index system according to aspects of this disclosure.

In an illustrative example and as illustrated in FIG. 6A, the conflict index system 270 may be configured to identify and determine a conflict index dataset 271. The conflict index system 270 may utilize a risk-response readiness dataset 272 and a contextual response score dataset 274. In some cases, the conflict index system 270 may include a conflict index engine 271A configured to generate conflict index datasets 271 and information associated with customers of the business organization. The conflict index system 270 and the conflict index engine 271A may utilize machine learning and weighted equation modeling with the inputs of the risk-response readiness dataset 272 and the contextual response score dataset 274 to generate the conflict index datasets 271. The conflict index engine 271A may utilize information received from the risk-response readiness dataset 272, the contextual response score dataset 274, and one or more remote devices associated with the user (e.g., the vehicle 210, the user interface device 212, the input device 214, and the user devices 220, 230) via the one or more networks.

In an illustrative example, the vehicle 210 may include a user interface 212 and an input device 214 accessible to an occupant of the vehicle. The user interface 212 may include a display and/or speakers for presenting audio and/or video information to the user. For example, the display may be used to present geographic information (e.g., a map, a route, etc.) and/or vehicle information (e.g., temperature information, vehicle speed, tire pressure, radio information, cabin environmental information, etc.) to the user via one or more user interface screens. In some cases, the user interface 212 may present the geographic information and/or the vehicle information as an audio message presented using speakers installed within the vehicle. In some cases, the user interface 212 may include a personal computing device 108b, such as the personal navigation device 110b, a smart phone 220a, a laptop computer 220c, and/or the tablet computer 220d. The personal navigation device 110b may be located, for example, in the vehicle 210 or in a mobile device (e.g., the smart phone 220a, the tablet computer 220d, etc.) with location tracking capabilities.

In some cases, such as when the user device 220 is a device capable of communication via a cellular network, the risk-predictive modeling information may be communicated from the vehicle 210 to the risk-predictive modeling system 240 via the cellular network in near real-time. In other cases, the risk-predictive modeling information may be stored within a memory of the user device 220 until the user device 220 is able to communicate the information, such as when the user device is in proximity of a wireless network (e.g., a Wi-Fi network). The memory may be embodied in a non-volatile memory (e.g., in a memory in personal navigation device 110) or portable media (e.g., CD-ROM, DVD-ROM, USB flash, etc. connected to personal computing device 108).

Figure 3:
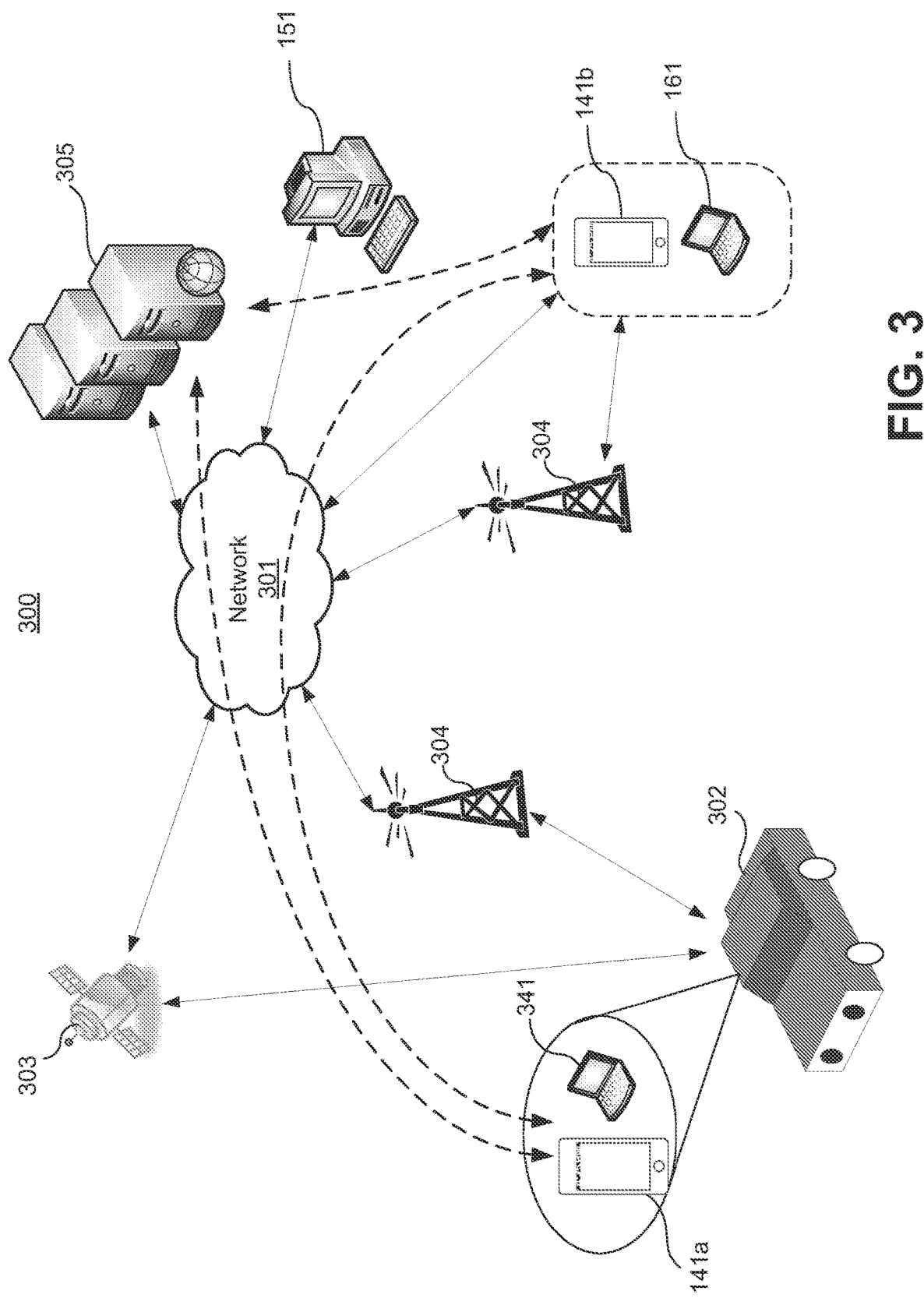
FIG. 3 depicts an illustrative block diagram of a system for a risk-predictive framework in accordance with aspects of this disclosure.

FIG. 3 shows an illustrative network environment 300 for implementing methods according to the present disclosure. The network environment 300 may include a network 301 configured to connect computing devices within or associated with a vehicle 302 (e.g., mobile computing device 141a and/or vehicle computing device 341), one or more satellites 303, one or more cellular network elements 304 (e.g., cell towers), one or more computing devices (e.g., 141b, 151, 161), and one or more application servers 305. Collectively, one or more of these computing devices may form a vehicle telematics system. In some aspects, the mobile computing device 141a or the vehicle computing device 341 may be used interchangeably or may complete similar or identical functions or tasks. In describing different features of the present invention either the mobile computing device 141a or the vehicle computing device 341 may be referred to, however, it should be noted that any time that only one of these devices is described, the described device could be interchanged with the other device.

The network 301 may be any type of network, such as the Internet 131, a telecommunications network, etc. described above, and may use one or more communication protocols (e.g., protocols for the Internet (IP), Bluetooth, cellular communications, satellite communications, etc.) to connect computing devices and servers within the network environment 300 to send and receive communications (e.g., notifications shown as dashed arrows) between the different devices. In some cases, the network 301 may include a cellular network and its components, such as base stations. Accordingly, for example, a mobile computing device 141a (e.g., a smartphone) of a driver or passenger in a vehicle 302 may communicate, via a cellular backhaul of the network 301, with an application server 305 which in turn may communicate, via the cellular backhaul of the network 301, with computing devices or application servers (e.g., 141b, 151, 161, and 305) to provide notifications. While FIG. 3 depicts arrows pointing to the vehicle 302, it should be understood that the connections may be made with the mobile computing device 141a and/or the vehicle computing device 341 within the vehicle 302. For example, the mobile computing device 141a and/or the vehicle computing device 341 may communicate with a satellite 303 to obtain GPS coordinates or to transfer notifications to the network 301 through the satellite 303. Further, it should be understood that the mobile computing device 141a (e.g., a smartphone) may connect to the network 301 even if it is removed from the vehicle 302.

While the illustrative example of FIG. 3 shows only one vehicle 302, the vehicle telematics system may be configured to communicate with multiple vehicles 302 simultaneously. Also, although FIG. 3 shows the vehicle 302 as a car, the vehicle 302 may be any type of vehicle, including a motorcycle, bicycle, scooter, drone (or other automated device), truck, bus, boat, plane, helicopter, etc. FIG. 3 also shows an illustrative subsystem within the network environment 300. Specifically, FIG. 3 shows an illustrative arrangement of computing devices that may exist within the vehicle 302 (and other vehicles not shown). To show these computing devices, FIG. 3 includes a view of the inside of the vehicle 302. As can be seen, the vehicle 302 may include a mobile computing device 141a and/or a vehicle computing device 341. In some embodiments, the mobile computing device 141a and the vehicle computing device 341 may communicate with one another (e.g., via BLUETOOTH). The mobile computing device 141a may be any mobile computing device (e.g., a smartphone, tablet, etc.) that is associated with a user (e.g., the driver, the passenger, etc.) of the vehicle 302. The mobile computing device 141a, the vehicle computing device 341, and/or other devices and servers (e.g., 141b, 151, 161, and 305) may be configured in a similar manner to the computing device 101 of FIG. 1A.

Further, the mobile computing device 141a and/or the vehicle computing device 241 may be configured to execute a mobile device program that provides computer-executable instructions for collecting and communicating vehicle telematics data. Also, the mobile computing device 141a and/or the vehicle computing device 341 may include a user interface for a user to provide inputs to and receive outputs from the vehicle telematics system. Such a mobile device program may be downloaded or otherwise installed onto the mobile computing device 141a and/or the vehicle computing device 341 using one or more different methods. Once installed onto the mobile computing device 141a and/or the vehicle computing device 341, a user may launch the mobile device program by, for example, operating buttons or a touchscreen on the mobile computing device 141a and/or the vehicle computing device 341. Additionally, or alternatively, the mobile computing device 141a and/or the vehicle computing device 341 may be configured to execute a web browser (e.g., an application for accessing and navigating the Internet) to access a webpage providing an interface for the vehicle telematics system.

In some embodiments, the mobile computing device 141*a* or the vehicle computing device 341 may also be configured to collect drive data using, e.g., an accelerometer, GPS, gyroscope, etc. of the mobile computing device 141*a* and/or the vehicle computing device 341. Drive data may include vehicle telematics data or any other data related to events occurring during a vehicle's trip (e.g., an impact to a part of the vehicle, a deployed airbag, a hard turning event, a hard braking event, an extended traffic slowdown, etc.). For example, drive data may include location information, such as GPS coordinates, indicating the geographical location of the mobile computing device 141*a* or the vehicle computing device 341 as well as speed and acceleration data that may be used to detect speeding, cornering, hard-braking, slow traffic and/or other such events. The mobile computing device 141*a* or the vehicle computing device 341 may be further configured to evaluate the drive data and to send notifications to the vehicle telematics system (e.g., application servers 305, computing devices 141*b*, 151, 161, etc.). Further, the mobile computing devices 141*a* or the vehicle computing device 341 may send notifications to specific computing devices or servers belonging to insurance providers interested in monitoring (or tracking) users of the mobile computing device 141*a* or the vehicle computing device 341. As such, for example, an insurance provider via servers or computing devices (e.g., 151, 305, etc.) may monitor the driving behavior of a driver of a vehicle 302 based on notifications sent from the driver's mobile computing device 141*a* or the vehicle computing device 341. Also, the vehicle telematics system may allow insurance providers to monitor driving behavior of others too. The mobile computing device 141*a* or the vehicle computing device 341 might not necessarily be associated with (e.g., belong to) the driver, and instead, may be associated with a passenger.

Although FIG. 2 shows a single mobile computing device 141*a* within the vehicle 302, in some cases the vehicle 202 may contain more or fewer mobile computing devices 141*a*. For example, the vehicle 302 may carry one or more passengers in addition to the driver, and each person may have one or more mobile computing devices 141*a*. In some cases, one or more people in the vehicle 302 may not have a mobile computing device 141*a* or may have left their mobile computing device 141*a* elsewhere. In such cases, where the vehicle 302 does not contain a mobile computing device 141*a*, vehicle operation may be monitored (e.g., by an insurance provider, etc.) by monitoring notifications received from the vehicle computing device 341 within the vehicle 302.

In some cases, the mobile computing device 141*a* and/or the vehicle computing device 341 may communicate notifications (see dashed arrows) to one or more external devices (e.g., the insurance provider computing devices). The notifications may be transmitted directly from the mobile computing device 141*a* or the vehicle computing device 341 to an insurance provider's computing device (e.g., 141*b*, 151, 161, etc.) and/or indirectly through, e.g., an application server 305 (e.g., a notification may be transmitted to an application server 305, which in turn may transmit a notification to the appropriate computing device 151).

In some cases, computing devices operated by the insurance provider may be configured to execute an insurance device program (e.g., computer-executable instructions) to establish restrictions and/or other conditions for triggering alerts based on vehicle telematics data. The insurance device program may also process computer-executable instructions to receive notifications from one or more mobile computing devices (e.g., the mobile computing device 141*a*, the vehicle computing device 341, etc.) and communicate parameter changes and/or other messages to the one or more mobile computing devices. The insurance device program may also provide a user interface for an insurance provider to provide inputs to and receive outputs from the vehicle telematics system. The insurance device program may be downloaded or otherwise installed onto a computing device operated by an insurance provider one or more methods. Once installed onto the computing device, a user may launch the insurance device program by, for example, operating buttons or a touchscreen on the computing device. Additionally, or alternatively, the computing device operated by the insurance company may be configured to execute a web browser (e.g., an application for accessing and navigating the Internet) to access a web page providing an interface for the vehicle telematics system.

As discussed above, the vehicle 302 may include the vehicle computing device 341. The vehicle computing device 341 may be configured in a similar manner to the computing device 101 of FIG. 1A. Further, the vehicle computing device 341 may be configured to execute the mobile device program in addition to, or instead of, the mobile computing device 141*a*. In some cases, the vehicle computing device 341 and the mobile computing device 141*a* may operate in conjunction so that the vehicle computing device 341 performs some modules of the mobile device program while the mobile computing device 141*a* performs other modules of the mobile device program. For example, the vehicle computing device may collect drive data (e.g., vehicle telematics data) and communicate the drive data, via a wired (e.g., USB) or wireless (e.g., BLUETOOTH) connection, to a mobile computing device 141*a* within the same vehicle 302 so that the mobile computing device 141*a* may evaluate the drive data and/or send notifications (providing evaluated drive data and/or raw drive data).

Further, the vehicle computing device 341 may be configured to connect to one or more devices (e.g., a GPS, sensors, etc.) installed on the vehicle 302, such as to collect the drive data. In some embodiments, the vehicle computing device 341 may be a computing system including multiple devices. For example, in some cases the vehicle computing device 341 may include the vehicle's on-board diagnostic (OBD) system. The vehicle computing device 341 may be configured to interface with one or more vehicle sensors (e.g., fuel gauge, tire pressure sensors, engine temperature sensors, etc.). The vehicle computing device may be configured to communicate directly or indirectly (e.g., through a mobile computing device 141*a*) with the vehicle telematics system. In some embodiments, there might not be a vehicle computing device 341 installed on the vehicle 302 that is configurable to interface with the vehicle telematics system, or the vehicle computing device 341 might not be able to communicate with a mobile computing device 141*a*.

In some cases, an autonomously controlled vehicle (e.g., the vehicle 302) may be controlled by its vehicle computing device 341 and/or a remote computing device (not shown) via the network 301 or another network. The vehicle computing device 341 may employ sensors for inputting information related to a vehicle's surroundings (e.g., distance from nearby objects) and use the inputted information to control components of the vehicle 302 to drive the vehicle 302.

In some cases, the vehicle telematics system 300 may include one or more application servers 305. The application servers 305 may be configured to receive notifications (which may include the raw vehicle telematics data or information indicating driving events) from devices (e.g., the mobile computing device 141a, the vehicle computing device 341, etc.) and process the notifications to determine whether conditions are met (e.g., whether insurance provider restrictions have been violated). The application servers 305 may include one or more databases for associating one or more mobile computing devices 141a and/or one or more vehicle computing devices 341.

One or more vehicle types may be utilized by a driver in accordance with aspects of this disclosure. For example, the vehicle types may include a personal vehicle type, governmental vehicles, and/or one or more commercial vehicle types, or other vehicle types that may be subject to insurance. The personal vehicle types may include a personal vehicle registered to an individual (or an estate) including, but not limited to a car, a minivan, a van, a truck, a pickup truck, a sports utility vehicle, a recreational vehicle, a motorcycle etc. Illustrative commercial vehicle types may include fleet vehicles such as taxis, limousines, personal vehicles used for business purposes (e.g., a ride sharing business, a delivery service, a courier service, etc.). Other illustrative commercial vehicles may include trucks (e.g., a concrete transport truck, a mobile crane, a dump truck, a garbage truck, a log carrier, a refrigerator truck, a tractor unit, a platform truck, a vehicle transport truck, a flatbed truck, a box truck, a panel van, a tow truck, a canopy express, a pickup truck, a cab-forward truck, a panel truck, a panel van, an ambulance, etc.) and/or buses (e.g., a motor coach, a school bus, etc.). Other vehicles used for commercial purposes may also exist and be applicable to aspects of the disclosure. In some cases, the vehicle types may include other vehicle types that may or may not be included in the above vehicle types, such as certain governmental vehicles (e.g., certain police vehicles, fire trucks, ambulances, military vehicles, etc.), farming equipment (e.g., tractors, combines, harvesters. etc.), recreational vehicles (e.g., boats, off-road vehicles, etc.), and the like. In some cases, a business organization may operate a fleet of vehicles and may monitor or otherwise analyze a risk index dataset associated with each vehicle, either in near real-time and/or after one or more trips have been completed for at least one vehicle in the fleet. In performing such analysis, the business organization may determine one or more times of day, weather conditions, and/or routes that are more likely to be associated with a higher level of risk. As such, the business organization may be able to better manage the deployment of their vehicles to avoid, or at least minimize, the particular times of day, route segments, weather conditions which may lead to higher levels of risk. An insurance company may incentivize this management of driver activity by offering a reduction in insurance costs, or other reward to the business organization.

As described above, the risk-predictive modeling system 240 may include one or more of the driver score system 250, the driver-contextual risk score system 260, and the conflict index system 270.

In an illustrative example and as illustrated in FIG. 4, the driver score system 250 may be configured to identify and determine a driver score dataset 251. Generally, the driver score dataset 251 provides a historical aggregate at-risk profile for the driver. The driver score dataset 251 is generally a historical metric and periodically updated. The driver score system 250 may utilize a driving behavior score dataset 252, a risk-exposure dataset 254, a driver-risk score dataset 256, and a driver characteristics dataset 258. In some cases, the driver score system 250 may include a driver score engine 251A configured to generate driver score datasets 251 and information associated with customers of the business organization. The driver score system 250 and the driver score engine 251A may utilize machine learning and weighted equation modeling with the inputs of the driving behavior score dataset 252, the risk-exposure dataset 254, the driver-risk score dataset 256, and the driver characteristics dataset 258 to generate the driver score datasets 251. The driver score engine 251A may utilize information received from the driving behavior score dataset 252, the risk-exposure dataset 254, the driver-risk score dataset 256, the driver characteristics dataset 258, and one or more remote devices associated with the user (e.g., the vehicle 210, the user interface device 212, the input device 214, and the user devices 220, 230) via the one or more networks.

One of the inputs into the driver score engine 251A is the driving behavior score dataset 252. In some cases, the driving behavior score dataset 252 may be specific to an individual driver. The driving behavior score dataset 252 may be derived and calculated based from the driver's telematics information. For example, the following one or more driving behaviors may be utilized for the driving behavior score dataset 252: improper speed, braking, inattentive, signal violation, improper interaction with others, improper passing, improper turning, avoiding maneuvers, and/or driving experiences. This driving behavior score dataset 252 may be a weighted average of the counts of the extreme driving behaviors, such as by counting the individual instances of extreme driving behaviors. Even though the driving behavior score dataset 252 is personalized to the driver, the driving behavior score dataset 252 may leverage information from other users/drivers to determine risk-weights for each of these behaviors. This driving behavior score dataset 252 is determined from past telematics data and builds with time over the driver's driving record, such as the frequency of hard braking and other driving behavior categories, acceleration and speeding profile, and jerk driving.

As used herein, the driving behavior score dataset 252 (or driver score/driving score) may refer to a measurement of driving abilities, safe driving habits, and other driver information. The driving behavior score dataset 252 may include a rating generated by the driver score system 250 of an insurance company, financial instruction, or other organization, based on the driver's age, vision, medical history, driving record, and/or other account data relating to the driver. For example, the driver score system 250 may periodically calculate driver scores for one or more of the insurance company's customers, and may use the driver scores to perform insurance analyses and determinations (e.g., determine coverage, calculate premiums and deductibles, award safe driver discounts, etc.). The driver score may be increased or decreased based on the real-time data collected by vehicle sensors, telematics devices, and other systems for measuring driving performance. For example, if a driver consistently drives within posted speed limits, wears a seatbelt, and keeps the vehicle in good repair, the driver score may be positively adjusted (e.g., increased). Alternatively, if a driver regularly speeds, drives aggressively, and does not properly maintain the vehicle, the driver score may be negatively adjusted (e.g., decreased). It should be understood that the driving behavior score dataset 252, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score. This driving behavior score dataset 252 is then utilized by the driver score engine 251A to help determine the driver score dataset 251.

Another input into the driver score engine 251A is the risk-exposure score dataset 254. Generally, the risk-exposure score dataset 254 includes information related to how frequent the driver is exposed to risk. The risk-exposure score dataset 254 is similar to a risk map aggregated over time and space. A risk map may be referenced, for example, by U.S. Pat. No. 9,672,738, titled Designing Preferred Vehicle Routes Based on Driving Scores from Other Vehicles. For example, the risk-exposure score dataset 254 may include such items as frequent trips via risky hotspots, local roads vs highway driving, congested vs non-congested traffic, weather conditions, time of day (commute-time driver), night-time driving, vacation trips, number of miles driven, hours spent in driving, experience (driver and route).

In some cases, the computing device 102b may use the information from the data sources 104b, 106b to generate values that may be used to calculate an estimated route risk for the risk-exposure score dataset 254. Some examples of the information that the data sources 104b, 106b may provide to the computing device 102b include, but are not limited to, accident information, geographic information, mapping information, and other types of information useful in generating a dataset of values for calculating an estimated route risk. The risk-exposure a historical database storing accident information, traffic data, vehicle volume data, vehicle density data, road characteristic data, or weather data Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), driver condition, and location (e.g., geographic coordinates, closest address, zip code, etc.) of vehicle at time of incident.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

In accordance with aspects of this disclosure, the data source 104b may provide the computing device 102b with geographic information that is used to generate new roadway feature risk values in a dataset or database of risk values and/or update existing risk values; where the roadway feature may comprise intersections, road segments, tunnels, bridges, or railroad crossings. Attributes associated with roadways may also be used in part to generate risk values. The computing device 102b may use at least part of the received geographic information to calculate a value, associate the value with a road segment (or other location information), and store the value in a database format. Numerous examples of geographic information were provided above. For example, the computing device 102b may receive geographic information corresponding to a road segment comprising accident information and roadway feature information and then calculate a risk value corresponding to the road segment. Therefore, when calculating a risk value corresponding to the road segment, the system may use, in one example, the geographic information and the accident information (if any accident information is provided). In alternative embodiments in accordance with aspects of this disclosure, the computing device may use accident information, geographic information, vehicle information, and/or other information, either alone or in combination, in calculating risk values corresponding to a road segment in the risk-exposure score dataset 254.

The risk-exposure score dataset 254 may further include one or more datasets capable of storing mapping information. In some cases, the mapping information may include geocoded mapping information stored within the risk-exposure score dataset 254. The geocoded mapping information may include, but not be limited to the location and mapping information discussed above, such as information about characteristics of a corresponding location (e.g., posted speed limit, construction area indicator, topography type, road type, road feature, number of intersections, whether a roundabout is present, number of railroad crossings, whether a passing zone is present, whether a merge is present, number of lanes, width of road/lanes, population density, condition of road, wildlife area, state, county, and/or municipality). The mapping information may also include other attribute information about road segments, intersections, bridges, tunnels, railroad crossings, and other roadway features. The mapping information may further include the address and/or latitude and longitude of noted geographic features and/or the characteristics of the corresponding location.

This risk-exposure score dataset 254 is then utilized by the driver score engine 251A to help determine the driver score dataset 251.

Another input into the driver score engine 251A is the driver-risk score dataset 256. Generally, the driver-risk score dataset 256 is the subset of the combination of the driving behavior score dataset 252 and the risk-exposure score dataset 254 where the driver has conducted dangerous behaviors and resulted in risk. The driver-risk score dataset 256 may include how many times the driver is the risk-causer via the driver's actions or behaviors. In some cases, analyzing contextual data may be necessary for the driver-risk score dataset 256. Additionally, the driver-risk score dataset 256 may include how the driver creates risk when there is none or how the driver enhances risk with the driver's behaviors when there is external risk. The driver-risk score dataset 256 may be a weighted average of the above scenarios. This driver-risk score dataset 256 is then utilized by the driver score engine 251A to help determine the driver score dataset 251.

Another input into the driver score engine 251A is the driver characteristics dataset 258. The driver characteristics dataset 258 may include one or more of the following factors such as: age, gender, education, and place of residence. Other factors of the driver characteristics dataset 258 may include one or more of the following: marital status, occupation, credit score, or a driver's historical medication use. Additionally, the driver characteristics dataset 258 may include historical driving data such as one or more of the following: driving experience, crash history, or traffic violations. This driver characteristics dataset 258 is then utilized by the driver score engine 251A to help determine the driver score dataset 251. Generally, traditional insurance uses this dataset extensively for pricing.

In an illustrative example and as illustrated in FIG. 5A, the driver-contextual risk score system 260 may be configured to identify and determine a driver-contextual risk score dataset 261. The driver-contextual risk score dataset 261 is generally a historical metric and periodically updated. The driver-contextual risk score system 260 may utilize a real-time driver risk score dataset 262, a contextual information dataset 264, and a road frustration index dataset 266. In some cases, the driver-contextual risk score system 260 may include a driver-contextual risk score engine 261A configured to generate driver-contextual risk score datasets 261 and information associated with customers of the business organization. The driver-contextual risk score system 260 and the driver-contextual risk score engine 261A may utilize machine learning and weighted equation modeling with the inputs of the real-time driver risk score dataset 262, the contextual information dataset 264, and the road frustration index dataset 266 to generate the driver-contextual risk score datasets 261. The driver-contextual risk score engine 261A may utilize information received from the real-time driver risk score dataset 262, the contextual information dataset 264, the road frustration index dataset 266, and one or more remote devices associated with the user (e.g., the vehicle 210, the user interface device 212, the input device 214, and the user devices 220, 230) via the one or more networks.

Figure 5B:
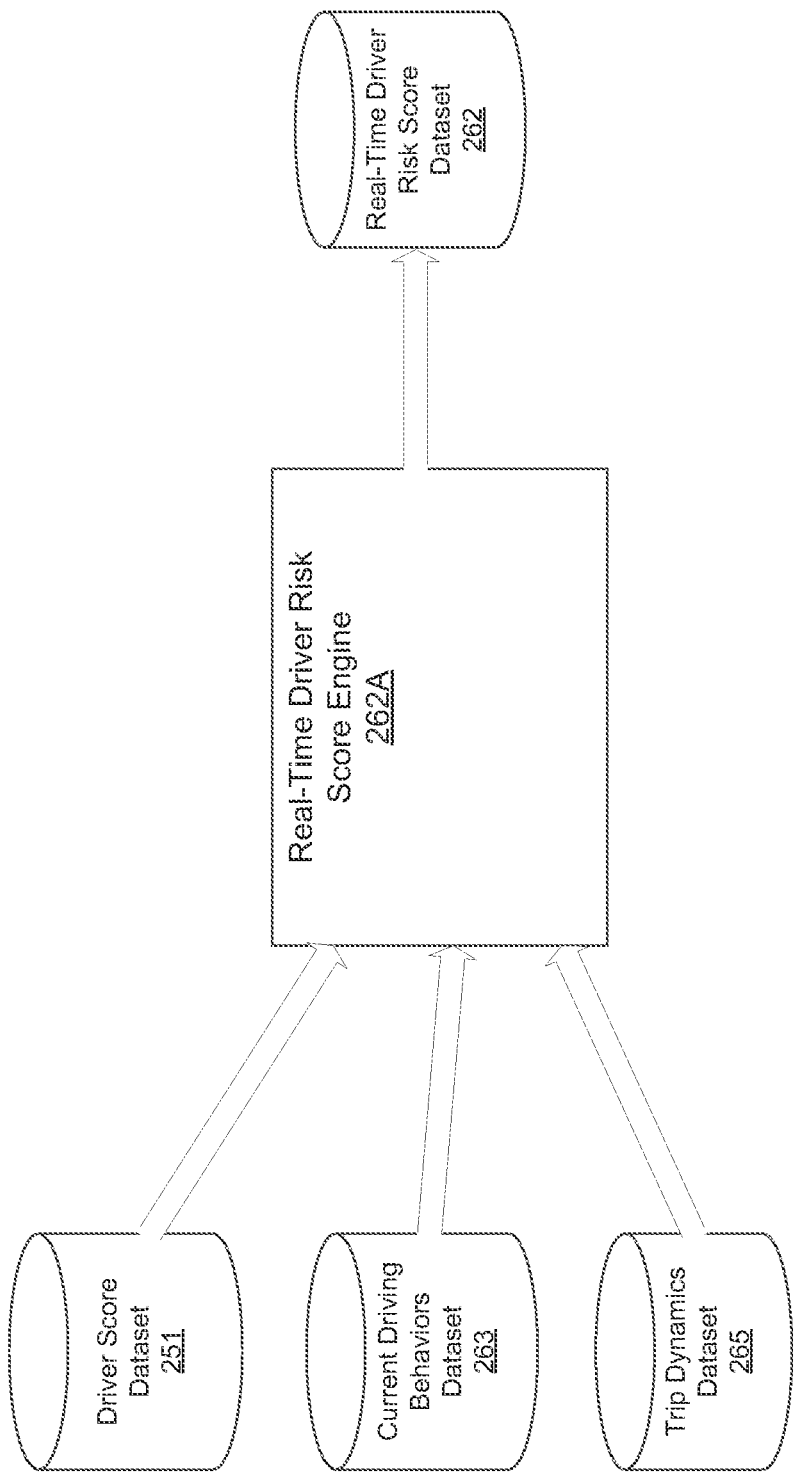
FIG. 5B shows an illustrative block diagram representation of a real-time driver risk score engine according to aspects of this disclosure.

One of the inputs into the driver-contextual risk score engine 261A is the real-time driver risk score dataset 262. The real-time driver risk score dataset 262 is a real-time snapshot of the driver's behavioral risk score. The real-time driver risk score dataset 262 may be utilized to learn or determine a model that is able to quantify a current behavior severity based on the driver's overall historic metric, e.g. a historically good driver hard braking in real-time may not be as dangerous as a historically bad driver, but a better judgement will be when context is evaluated. FIG. 5B illustrates the real-time driver risk score dataset 262 and a real-time driver risk score engine 262A. The real-time driver risk score engine 262A may utilize the driver score dataset 251 as described and detailed above, a current driving behaviors dataset 263, and a trip dynamics dataset 265. The real-time driver risk score engine 262A may utilize machine learning and weighted equation modeling with the inputs of the driver score dataset 251, the current driving behaviors dataset 263, and the trip dynamics dataset 265 to generate the real-time driver risk score dataset 262. The current driving behaviors dataset 263 may include current and real-time telematics information about a driver, such as: real-time improper speeding, real-time improper braking, real-time inattentiveness, real-time signal violation, real-time improper interaction with others, real-time improper passing, real-time improper turning, and/or real-time avoiding maneuvers. The trip dynamics dataset 265 may include information such as the journey made and the time/distance remaining for the journey for the driver. The real-time driver risk score engine 262A may be configured to generate the real-time driver risk score dataset 262 and information associated with customers of the business organization. The real-time driver risk score engine 262A may utilize information received from the driver score dataset 251, the current driving behaviors dataset 263, the trip dynamics dataset 265, and one or more remote devices associated with the user (e.g., the vehicle 210, the user interface device 212, the input device 214, and the user devices 220, 230) via the one or more networks. This real-time driver risk score dataset 262 is then utilized by the driver-contextual risk score engine 261A to help determine the driver-contextual risk score dataset 261.

Another input into the driver-contextual risk score engine 261A is the contextual information dataset 264. The contextual information dataset 264 may include various information, such as risk map attributes as described above (such as road type, junction type, no. of lanes etc.), traffic dynamics, and the traffic scene, such as derived features from the circumference around the vehicle. In some examples, the contextual information dataset 264 may include weather data (e.g., ambient temperature, ambient lightning conditions, time of day, daytime, nighttime, twilight, clear, dry, wet, fog, rain, ice, snow, clouds, or sun glare), infrastructure data (e.g., road geometry, road gradient, road curvature, number of lanes, lane width, shoulder width, straight road path, curved road path, intersection on a straight road path, intersection on a curved road path, entrance/exit ramps, bridges, merge lanes, asphalt road surface, concrete road surface, parking lot, loading area, alleyway, one-way road, rural/urban undivided road, rural/urban divided road via a median, rural/urban divided road, or gravel/sand road), traffic data (e.g., types of traffic signs, traffic congestion, traffic inflow/outflow, speed of lead/following/side vehicle, spacing between vehicles, response variable time headway between vehicles, type of leading vehicle, traffic flow, remaining travel time, location, field of view, or crosswalks), and/or vehicle characteristics (e.g., other vehicle headlight glare, vehicle mass, vehicle type, vehicle controls, vehicle features, or mechanical failures). The contextual information dataset 264 and contextual information may be generated from various methods such as: a forward-facing camera or a lidar-camera as in an autonomous set-up. This contextual information dataset 264 is then utilized by the driver-contextual risk score engine 261A to help determine the driver-contextual risk score dataset 261.

Another input into the driver-contextual risk score engine 261A is the road frustration index dataset 266. In an illustrative example, the frustration index dataset 266 may include a predicted state of mind of the user. The frustration index dataset 266 may also include a level of frustration being experienced by a user and/or predicted to be experience when traveling over one or more route segments for one or more users, such as insurance customers of an insurance company. The frustration index dataset 266 may include demographic information, telematics information, and the like associated with the user, along with frustration information solicited or otherwise received from the user when calculating or predicting the frustration index value.

In some cases, the input device 214 may include one or more means for the driver and/or passenger in the vehicle to provide information about how they feel regarding a plurality of road segments or type of road segment (e.g., frustration information). The input device 214 may be configured to provide the frustration information in real-time or near real-time to the risk-predictive modeling system 240 for processing.

In some cases, the driver and/or passenger in the vehicle 210 may provide frustration information (e.g., using the user interface 212, the input device 214 and/or the user devices 220) regarding how they feel towards a particular road segment or type of road segment (e.g., a low level of frustration, a medium level of frustration, a high level of frustration, etc.) to be processed using one or more algorithms to determine a level of frustration associated with the user in near real-time and/or a level of frustration predicted to be experienced by the user on one or more particular road segments. For example, a user may experience some level of frustration based on traffic loading being experienced, or knowledge of potential traffic loading along the route, or in a known location, or the driver's own sense or urgency. In some cases, the way a person drives and/or acts in a particular driving situation may be influenced by the level of frustration being experienced, along with any objective or subjective risk, present during a time the vehicle is on a particular road segment. In some cases, the frustration index dataset 266 may include frustration information, with or without other information (e.g., subjective risk information, objective risk information, weather information, traffic loading information, time of day information, etc.), to generate frustration index value for the user when traveling an identified road segment. In some cases, a map identifying a level of frustration that may be appreciated, or predicted to be appreciated, by the driver over a travel route. In some cases, the frustration index dataset 266 may include road frustration information, along with the vehicle speed and/or a road segment classification, to generate a route for use by the user in navigating to a desired location. The identified route may identify a predicted road frustration index value, one or more identified subjective risks and/or objective risks that may be appreciated by the driver and/or may be configured to avoid one or more of the road segments associated with a road frustration index value that meets a predetermined criterion, identified subjective risks and/or identified objective risks.

In some cases, the input device 214 may be configured to communicate driver frustration level information via a telecommunications network directly to the frustration index dataset 266. In some cases, one or more sensors may be used (e.g., biometric sensors, pressure sensors, microphones, etc.) may be used to generate a signal representative of a driver's level of frustration, without the driver consciously providing the information. For example, one or more biometric sensors may be used to sense an increase in a heart rate, breathing rate, and/or the like. In other cases, a pressure sensor may be embedded within the steering wheel of the vehicle and configured for sensing a grip pressure (e.g., an ongoing pressure). Such examples illustrative and are not to limit the sensor type or location to the enumerated examples. This road frustration index dataset 266 is then utilized by the driver-contextual risk score engine 261A to help determine the driver-contextual risk score dataset 261.

In an illustrative example and as illustrated in FIG. 6A, the conflict index system 270 may be configured to identify and determine a conflict index dataset 271. The conflict index dataset 271 is a combination of the contextual scene (driver-contextual risk score dataset 261) plus the driver (driver score dataset 251). For example, there are difference between the behaviors and the reactions, as behaviors are in general driving actions exhibited by the driver, and reactions are actions deployed during a risk to evade. The conflict index dataset 271 includes the efficiency and timeliness of these reactions along with the scene configuration and how these contribute to crash causation. Reactionary actions may include braking and steering (maneuvering). The conflict index dataset 271 may be a historical metric or updated in real-time. The conflict index system 270 may utilize a risk-response readiness dataset 272 and a contextual response score dataset 274. In some cases, the conflict index system 270 may include a conflict index engine 271A configured to generate conflict index datasets 271 and information associated with customers of the business organization. The conflict index system 270 and the conflict index engine 271A may utilize machine learning and weighted equation modeling with the inputs of the risk-response readiness dataset 272 and the contextual response score dataset 274 to generate the conflict index datasets 271. The conflict index engine 271A may utilize information received from the risk-response readiness dataset 272, the contextual response score dataset 274, and one or more remote devices associated with the user (e.g., the vehicle 210, the user interface device 212, the input device 214, and the user devices 220, 230) via the one or more networks.

Figure 6B:
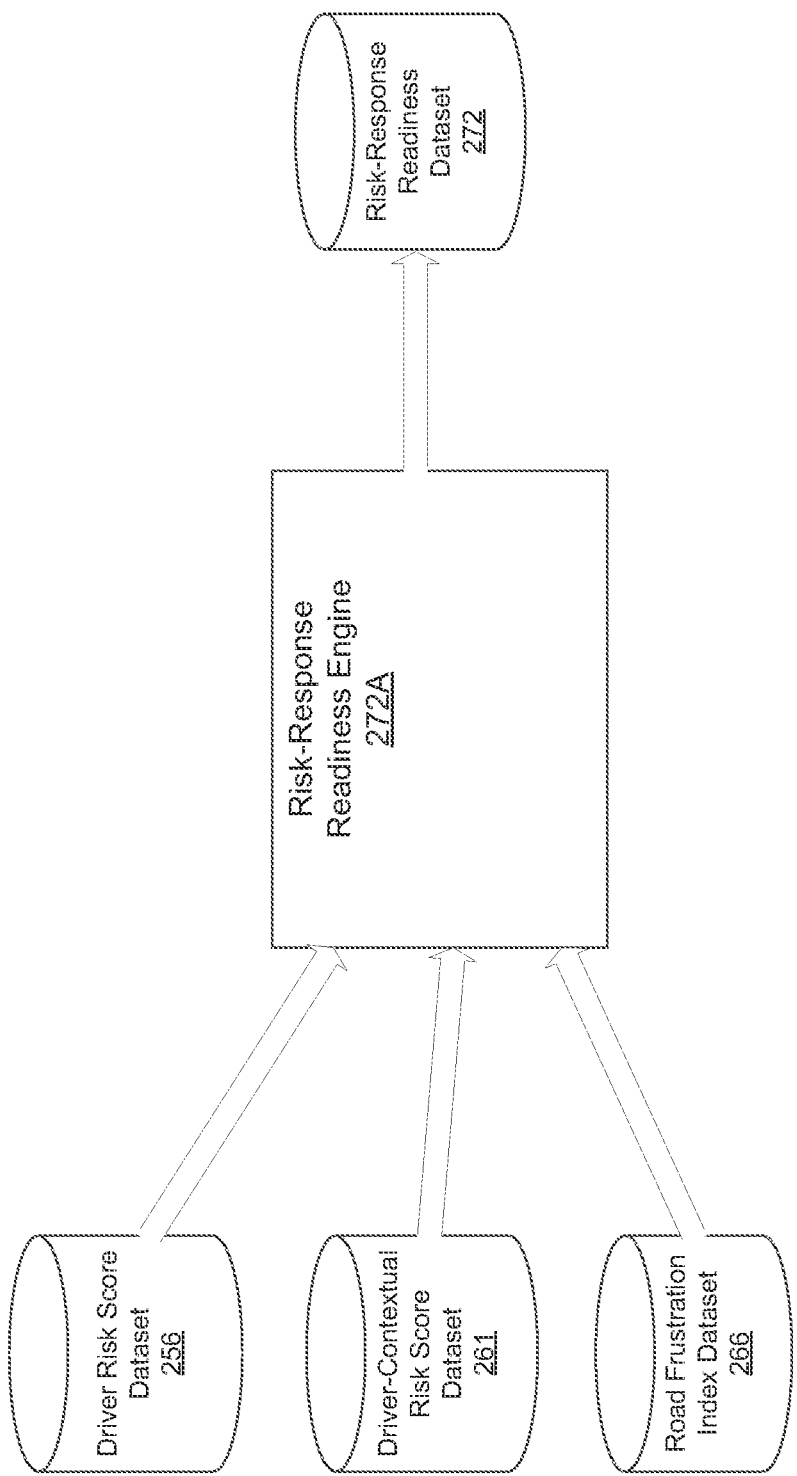
FIG. 6B shows an illustrative block diagram representation of a risk-response readiness engine according to aspects of this disclosure.

One of the inputs into the conflict index engine 271A is the risk-response readiness dataset 272. The risk-response readiness dataset 272 is an index from a global perspective of how certain driving behaviors plus scene-configuration effects reactions. The risk-response readiness dataset 272 may then be fine-tuned to be driver-specific. FIG. 6B illustrates the risk-response readiness dataset 272 and a risk-response readiness engine 272A. The risk-response readiness engine 272A may utilize the driver-risk score dataset 256 as described and detailed above, the driver-contextual risk score dataset 261 as described and detailed above, and the road frustration index dataset 266 as described and detailed above. The risk-response readiness engine 272A may utilize machine learning and weighted equation modeling with the inputs of the driver-risk score dataset 256, the driver-contextual risk score dataset 261, and the road frustration index dataset 266 to generate the risk-response readiness dataset 272. The risk-response readiness engine 272A may be configured to generate the risk-response readiness dataset 272A and information associated with customers of the business organization. The risk-response readiness engine 272A may utilize information received from the driver-risk score dataset 256, the driver-contextual risk score dataset 261, the road frustration index dataset 266, and one or more remote devices associated with the user (e.g., the vehicle 210, the user interface device 212, the input device 214, and the user devices 220, 230) via the one or more networks. This risk-response readiness dataset 272 is then utilized by the conflict index engine 271A to help determine the conflict index dataset 271.

Another input into the conflict index engine 271A is the contextual response score dataset 274. The contextual response score dataset 274 may include the context or scene-configuration as this is important to determine if the utilized reactions are sufficient. The contextual response score dataset 274 may include other various information, such as one or more of the following: number of autonomous vehicles, number of human drivers, pedestrians or others in the scene, and a risk map score as described above. The contextual response score dataset 274 may also include an analysis of the current scene context (such as number of vehicles around, lane dynamics, traffic dynamics). This contextual response score dataset 274 is then utilized by the conflict index engine 271A to help determine the conflict index dataset 271.

FIGS. 7-9B show illustrative methods for a risk-predictive framework for driving using driving behaviors and driving reactions and using one or more of three different indicators of risk: a driver score dataset 251, a driver-contextual score dataset 261, and a conflict index dataset 271. Each of the driver score dataset 251, the driver-contextual score dataset 261, and the conflict index dataset 271 may be combined to define an overall driving risk index value in accordance with aspects of this disclosure.

Figure 7:
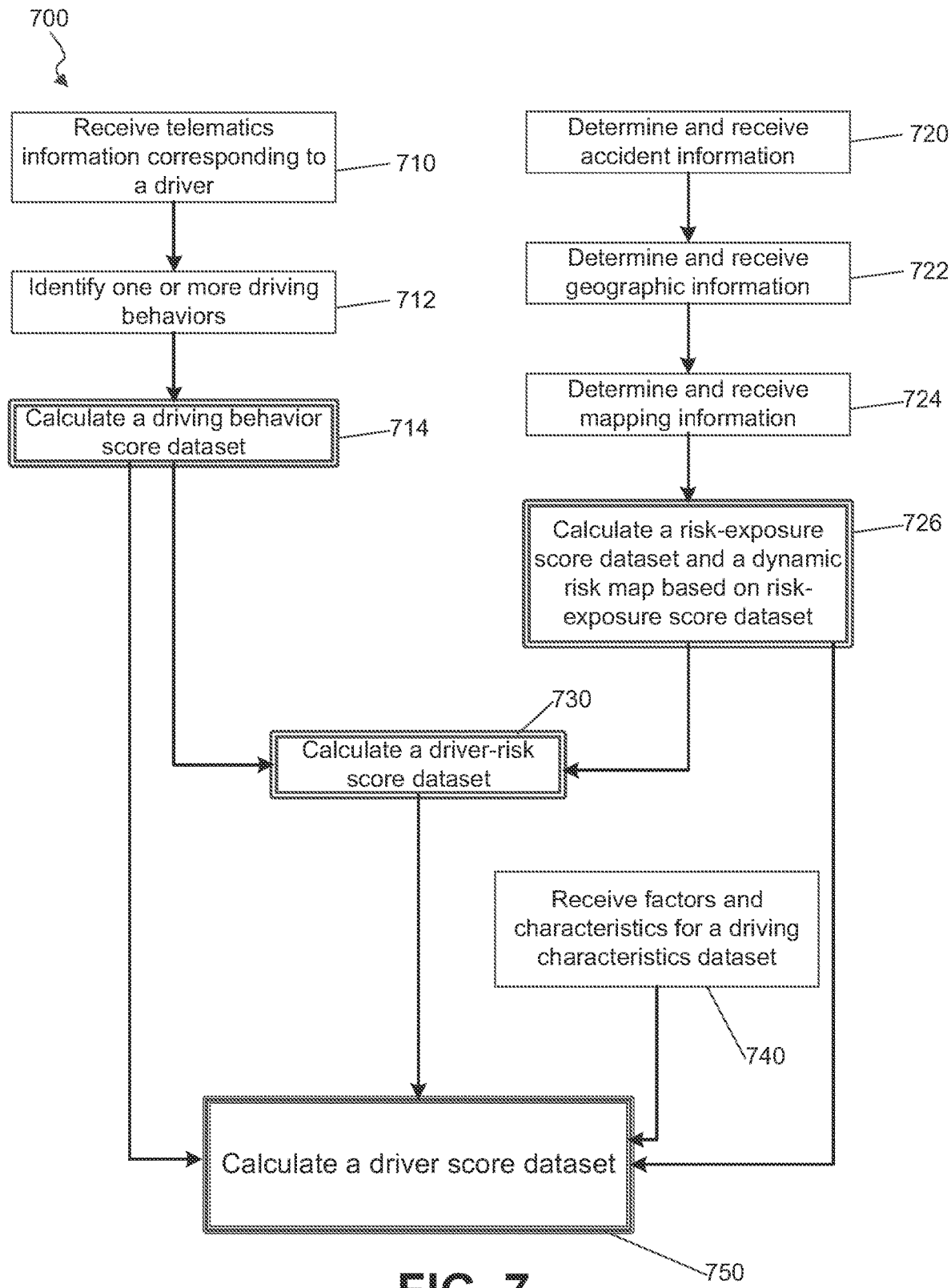
FIG. 7 shows an illustrative method for calculating a driver score dataset in accordance with aspects of this disclosure.

FIG. 7 shows an illustrative method 700 to determine and calculate a driver score and driver score dataset 251 in accordance with aspects of this disclosure. The method 700 for calculating a driver score dataset 251 includes the steps of 714 calculating a driving behavior score dataset 252, 726 calculating a risk-exposure dataset 254 and a dynamic risk map based on the risk-exposure dataset 254, 730 calculating a driver-risk score dataset 256, and 740 receiving factors and characteristics for a driver characteristics dataset 258.

At 710, the driver score system 250 may receive telematics information corresponding to a driver. In some cases, the telematics information may be received from a vehicle telematics system, wherein a mobile computing device 141a or a vehicle computing device 341 may be configured to collect telematics information using, e.g., an accelerometer, GPS, gyroscope, etc. of the mobile computing device 141a and/or the vehicle computing device 341 (on-board telematics device) or any combination thereof.

At 712, the driver score system 250 may identify one or more driving behaviors from the received telematics information. In some cases, the driver score system 250 may identify one or more of the following driving behaviors from the received telematics information: improper speed, braking, inattentive, signal violation, improper interaction with others, improper passing, improper turning, avoiding maneuvers, and/or driving experiences.

At 714, the driver score system 250 and driver score engine 251 may calculate a driving behavior score dataset 252. In some cases, the driving behavior score dataset 252 may be calculated by the driver score system 250 using a weighted average of the extreme driving behaviors, such as by counting the individual instances of extreme driving behaviors. In some cases, the driving behavior score dataset 252 may be determined by the driver score system 250 from past telematics information and data and built with time over the driver's driving record.

At 720, the driver score system 250 may determine and receive accident information from one or more of the data sources 104b, 106b. At 722, the driver score system 250 may determine and receive geographic information from one or more of the data sources 104b, 106b. At 724, the driver score system 250 may determine and receive mapping information from one or more of the data sources 104b, 106b.

At 726, the driver score system 250 and driver score engine 251 may calculate a risk-exposure score dataset 254 and a dynamic risk map based on the risk-exposure score dataset 254. In some cases, the risk-exposure score dataset 254 may include information related to how frequent the driver is exposed to risk and a risk map aggregated over time and space. In some cases, the risk-exposure score dataset 254 may be a calculated route risk from the information from the data sources 104b, 106b, such as the accident information, geographic information, and mapping information.

At 730, the driver score system 250 may calculate a driver-risk score dataset 256. In some cases, the driver score system 250 may calculate the driver-risk score dataset 256 based on the driving behavior score dataset 252 and the risk-exposure score dataset 254. Generally, the driver-risk score dataset 256 is the subset of the combination of the driving behavior score dataset 252 and the risk-exposure score dataset 254. In some cases, the driver-risk score dataset 256 may include how many times the driver is the risk-causer via the driver's actions or behaviors. In some cases, the driver-risk score dataset 256 may be a weighted average of the above scenarios.

At 740, the driver score system 250 may receive factors and characteristics for a driver characteristics dataset 258. In some cases, the factors and characteristics may include age, gender, education, and place of residence. In some cases, other factors of the driver characteristics dataset 258 may include one or more of the following: marital status, occupation, credit score, or a driver's historical medical use.

At 750, the driver score system 250 and the driver score engine 251A may calculate a driver score dataset 251, with the driver score engine 251A configured to generate the driver score dataset 251. The driver score system 250 and the driver score engine 251A may utilize machine learning and weighted equation modeling with the inputs of the driving behavior score dataset 252, the risk-exposure score dataset 254, the driver-risk score dataset 256, and the driver characteristics dataset 258.

Figure 8A:
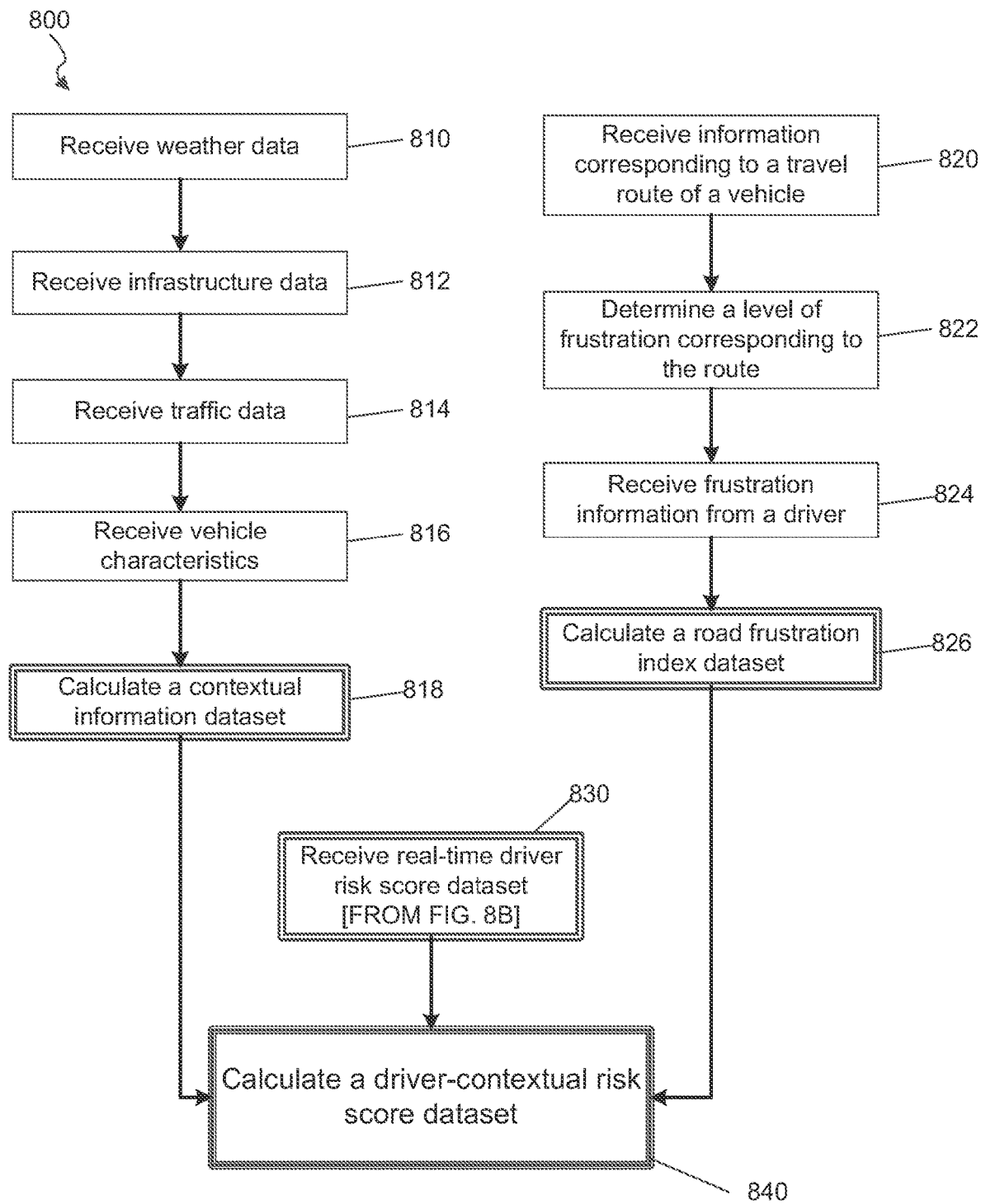
FIG. 8A shows an illustrative method for calculating a driver-contextual risk score dataset in accordance with aspects of this disclosure.

FIG. 8A shows an illustrative method 800 to determine and calculate a driver-contextual risk score dataset 261 in accordance with aspects of this disclosure. The method 800 for calculating a driver-contextual risk score dataset 261 includes the steps of 818 calculating a contextual information dataset 264, 826 calculating a road frustration index dataset 266, and 830 receiving a real-time driver risk score dataset 262.

At 810, the driver-contextual risk score system 260 may receive weather data. At 812, the driver-contextual risk score system 260 may receive infrastructure data. At 814, the driver-contextual risk score system 260 may receive traffic data. At 816, the driver-contextual risk score system 260 may receive vehicle characteristics.

At 818, the driver-contextual risk score system 260 and the driver-contextual risk score engine 261A may calculate a contextual information dataset 264. In some cases, the driver-contextual risk score engine 261A may calculate the contextual information dataset 264 based on one or more of the following: the weather data, the infrastructure data, the traffic data, and the vehicle characteristics.

At 820, the driver-contextual risk score system 260 may receive information corresponding to a travel route of a vehicle. In some cases, the driver-contextual risk score system 260 may receive route information before a trip begins. In some cases, the route information may be received as a vehicle travels along a route segment. In some cases, additional information about a driver of the vehicle, or the vehicle itself may be included. This additional information may include user demographic information, car make and model information for the vehicle, driver's license information (e.g., personal driver's license, commercial driver's license, etc.), insurance policy information, a driver experience level, and the like. In some cases, this additional information may include historical information corresponding to the route, such as historical traffic information, historical weather information, and the like.

At 822, the driver-contextual risk score system 260 may determine a level of frustration corresponding to the route. In some cases, frustration information may be provided from the input device 214 regarding how the driver feels towards a particular road segment or type of road segment to be processes using one or more algorithms to determine a level of frustration associated with the user in near real-time and/or a level of frustration predicted to be experienced by the user on one or more particular road segments.

At 824, the driver-contextual risk score system 260 may receive frustration information from a driver or may be derived from how the driver is driving. In some cases, the input device 214 may be configured to communicate driver frustration information with one or more sensors, such as biometric sensors, pressure sensors, or microphones.

At 826, the driver-contextual risk score system 260 and the driver-contextual risk score engine 261A may calculate a road frustration index dataset 266. In some cases, the driver-contextual risk score engine 261A may calculate the road frustration index dataset 266 based on the level of frustration corresponding to the route and the frustration information from the driver. In some cases, the frustration index dataset 266 may include a state of mind of the user. In some cases, the frustration index dataset 266 may also include a level of frustration being experienced by a user and/or predicted to be experience when traveling over one or more route segments for one or more users, such as insurance customers of an insurance company. In some cases, the frustration index dataset 266 may include demographic information, telematics information, and the like associated with the user, along with frustration information solicited or otherwise received from the user when calculating or predicting a frustration index value.

Figure 8B:
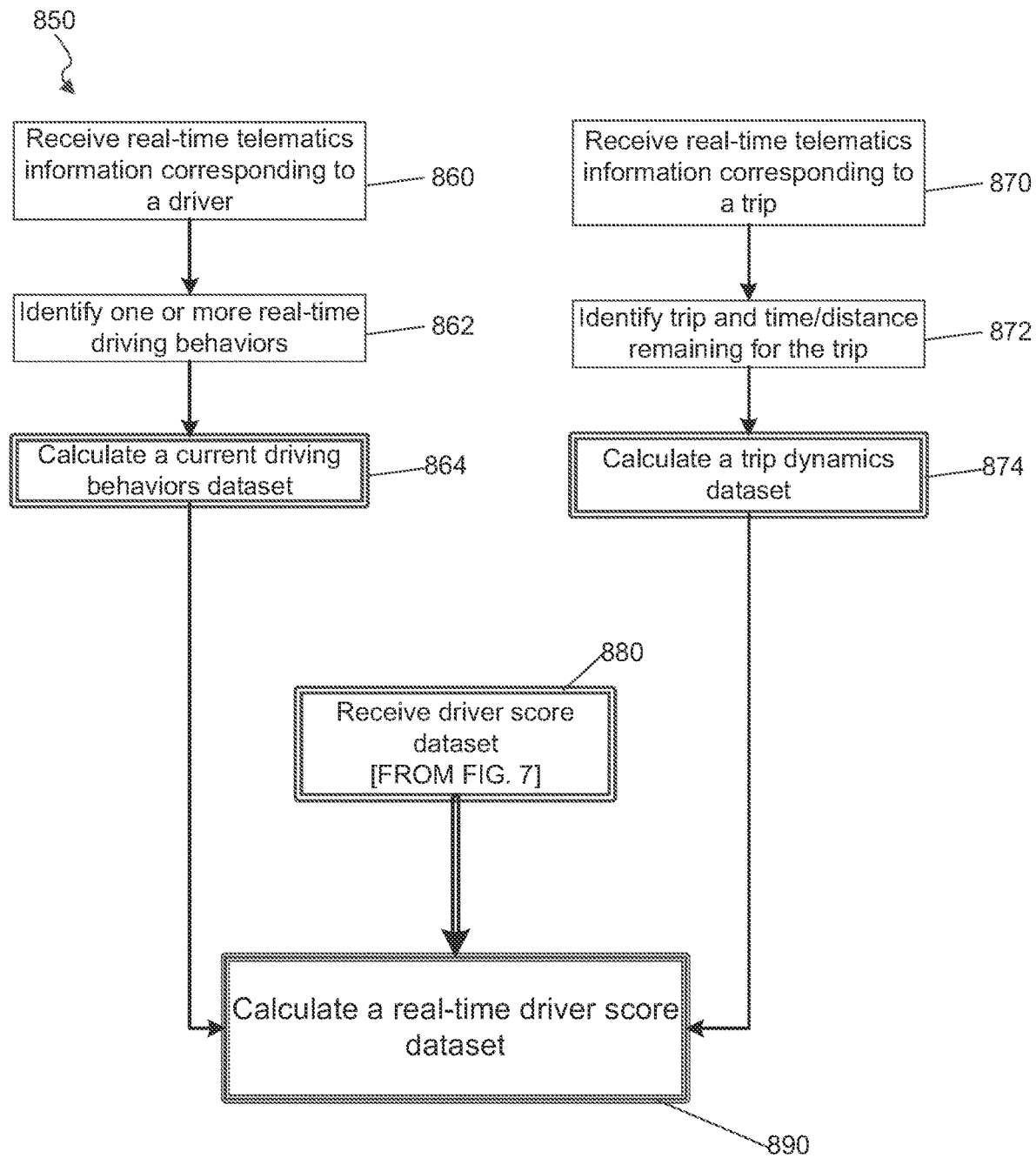
FIG. 8B shows an illustrative method for calculating a real-time driver score dataset in accordance with aspects of this disclosure.

At 830, the driver-contextual risk score system 260 receives the real-time driver risk score dataset 262. In order to determine and calculate the real-time driver risk score dataset 262, FIG. 8B shows an illustrative method 850 to determine and calculate the real-time driver risk score dataset 262 in accordance with aspects of this disclosure. The method 850 for calculating the real-time driver risk score dataset 262 includes the steps of 864 calculating a current driving behaviors dataset 263, 874 calculating a trip dynamics dataset 265, and 880 receiving the driver score dataset 251 (from FIG. 7).

At 860, the driver-contextual risk score system 260 receives real-time telematics information corresponding to a driver. In some cases, the real-time telematics information may be received from a vehicle telematics system, wherein a mobile computing device 141*a* or a vehicle computing device 341 may be configured to collect the real-time telematics information using, e.g., an accelerometer, GPS, gyroscope, etc. of the mobile computing device 141*a* and/or the vehicle computing device 341 (on-board telematics device) or any combination thereof.

At 862, the driver-contextual risk score system 260 may identify one or more real-time driving behaviors from the received real-time telematics information. In some cases, the driver-contextual risk score system 260 may identify one or more of the following driving behaviors from the received telematics information: real-time improper speed, real-time braking, real-time inattentiveness, real-time signal violation, real-time improper interaction with others, real-time improper passing, real-time improper turning, and/or real-time avoiding maneuvers.

At 864, the driver-contextual risk score system 260 and driver-contextual risk score engine 261A may calculate a current driving behaviors dataset 263. In some cases, the current driving behaviors dataset 263 may be calculated by the driver-contextual risk score system 260 using a weighted average of the real-time extreme driving behaviors, such as by counting the individual instances of real-time extreme driving behaviors. In some cases, the current driving behaviors dataset 263 may be determined by the driver-contextual risk score system 260 from real-time telematics information.

At 870, the driver-contextual risk score system 260 receives real-time telematics information corresponding to a trip. In some cases, the real-time telematics information corresponding to the trip may be received from a vehicle telematics system, wherein a mobile computing device 141*a* or a vehicle computing device 341 may be configured to collect the real-time telematics information using, e.g., an accelerometer, GPS, gyroscope, etc. of the mobile computing device 141*a* and/or the vehicle computing device 341 (on-board telematics device) or any combination thereof.

At 872, the driver-contextual risk score system 260 may identify the trip, time remaining for the trip, and distance remaining for the trip from the received real-time telematics information.

At 874, the driver-contextual risk score system 260 may calculate a trip dynamics dataset 265. In some cases, the trip dynamics dataset 265 may include information such as the trip made and the time/distance remaining for the trip for the driver.

At 880, the driver-contextual risk score system 260 may receive the driver score dataset 251. As detailed above and illustrated in FIG. 7, the driver score dataset 251 includes the driving behavior score dataset 252, the risk-exposure dataset 254, the driver-risk score dataset 256, and the driver characteristics dataset 258.

At 890, the driver-contextual risk score system 260 and driver-contextual risk score engine 261A may calculate a real-time driver score dataset 262. In some cases, to calculate the real-time driver score dataset 262, the driver-contextual risk score system 260 and driver-contextual risk score engine 261A may utilize machine learning and weighted equation modeling with the inputs of the current driving behaviors dataset 263, the trip dynamics dataset 265, and the driver score dataset 251.

Moving back to FIG. 8A, at 840, the driver-contextual risk score system 260 and the driver-contextual risk score engine 261A may calculate a driver-contextual risk score dataset 261. In some cases, to calculate the driver-contextual risk score dataset 261, the driver-contextual risk score system 260 and driver-contextual risk score engine 261A may utilize machine learning and weighted equation modeling with the inputs of the real-time driver risk score dataset 262, the contextual information dataset 264, and the road frustration index dataset 266.

Figure 9A:
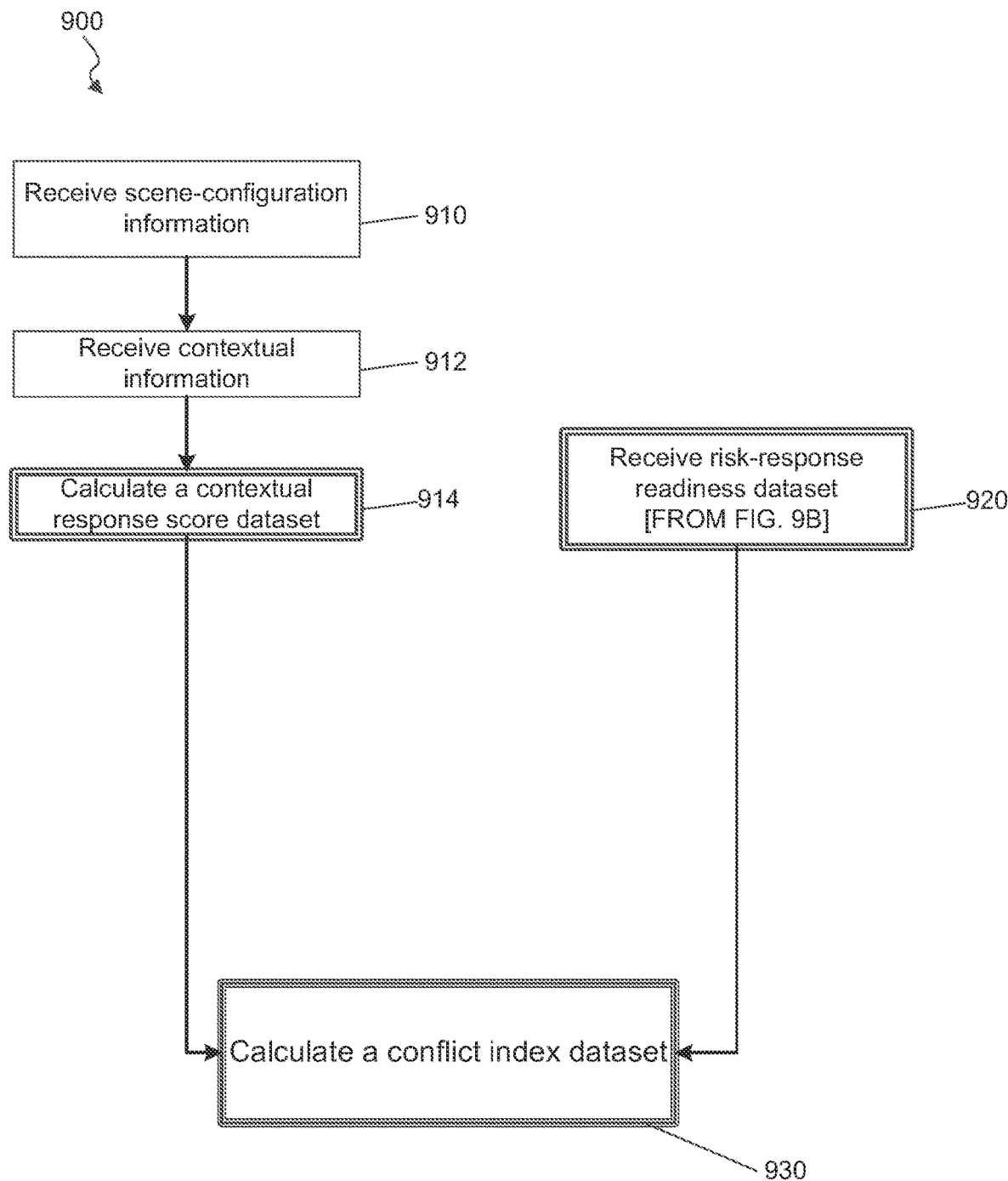
FIG. 9A shows an illustrative method for calculating a conflict index dataset in accordance with aspects of this disclosure.

FIG. 9A shows an illustrative method 900 to determine and calculate a conflict index dataset 271 in accordance with aspects of this disclosure. The method 900 for calculating a conflict index dataset 271 includes the steps of 914 calculating a contextual response score dataset 274 and 920 receiving a risk-response readiness dataset 272.

At 910, the conflict index system 270 may receive scene-configuration information. In some cases, the scene-configuration information may include the current scene context, such as number of vehicles around, lane dynamics, and/or traffic dynamics.

At 912, the conflict index system 270 may receive contextual information. In some cases, the contextual information may include one or more of the following: number of autonomous vehicles, number of human drivers, pedestrians or others at the scene, and a risk map score.

At 914, the conflict index system 270 and the conflict index engine 271A may calculate a contextual response score dataset 274. The conflict index engine 271A may calculate the contextual response score dataset 274 based on the scene-configuration information and the contextual information to determine if a utilized reaction is sufficient.

Figure 9B:
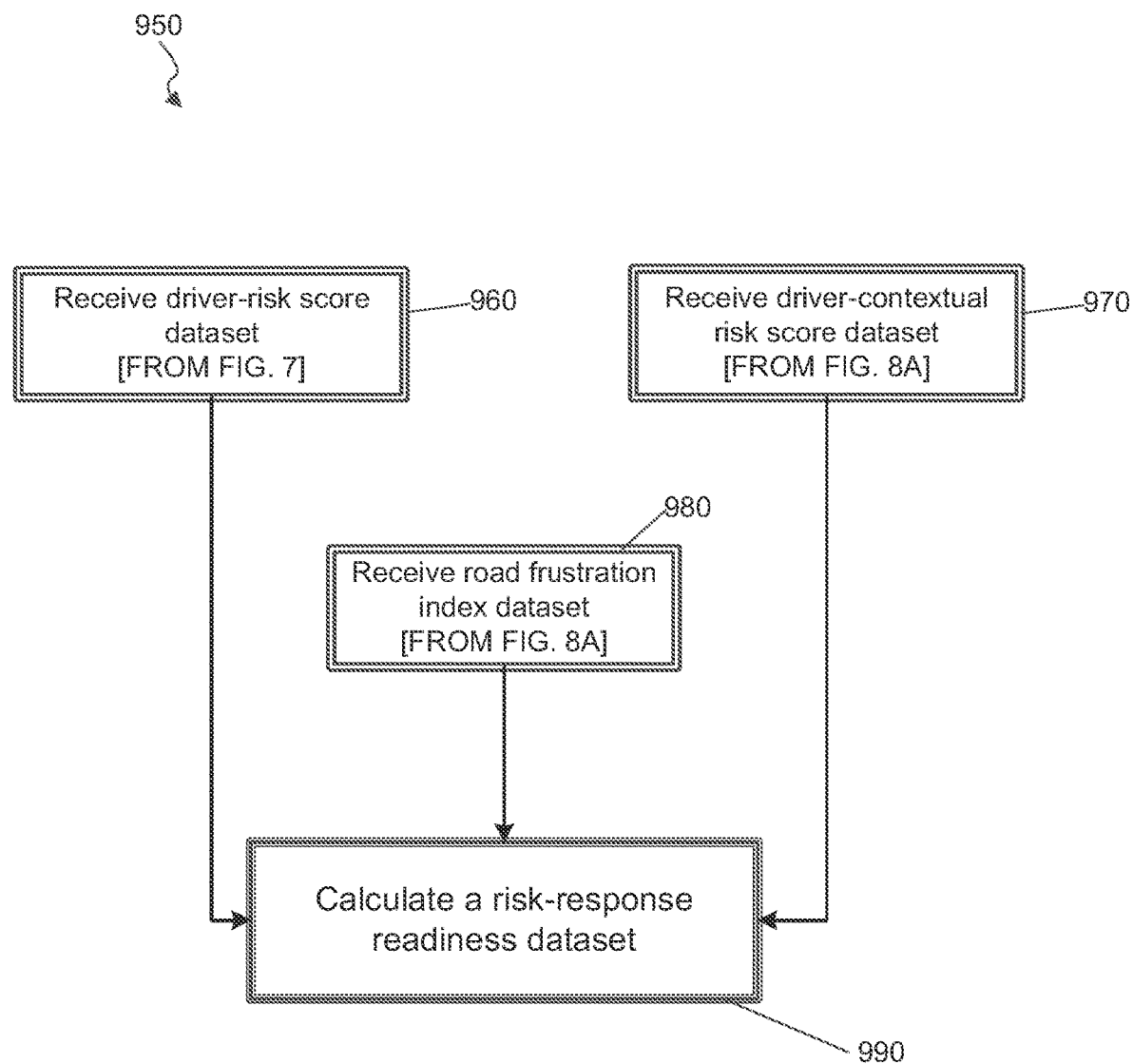
FIG. 9B shows an illustrative method for calculating a risk-response readiness dataset in accordance with aspects of this disclosure.

At 920, the conflict index system 270 receives the risk-response readiness dataset 272. In order to determine and calculate the risk-response readiness dataset 272, FIG. 9B shows an illustrative method 950 to determine and calculate the risk-response readiness dataset 272 in accordance with aspects of this disclosure. The method 950 for calculating the risk-response readiness dataset 272 includes the steps of 960 receive driver-risk score dataset 256 (from FIG. 7), 970 receive driver-contextual risk score dataset 261 (from FIG. 8A), and 980 receive road frustration index dataset 266 (from FIG. 8A).

At 960, the conflict index system 270 may receive the driver-risk score dataset 256. As detailed above and illustrated in FIG. 7, the driver-risk score dataset 256 may be calculated based on the driving behavior score dataset 252 and the risk-exposure score dataset 254. Generally, the driver-risk score dataset 256 is the subset of the combination of the driving behavior score dataset 252 and the risk-exposure score dataset 254. In some cases, the driver-risk score dataset 256 may include how many times the driver is the risk-causer via the driver's actions or behaviors. In some cases, the driver-risk score dataset 256 may be a weighted average of the above scenarios.

At 970, the conflict index system 270 may receive the driver-contextual risk score dataset 261. As detailed above and illustrated in FIG. 8A, the driver-contextual risk score dataset 261 may be calculated using the real-time driver risk score dataset 262, the contextual information dataset 264, and the road frustration index dataset 266.

At 980, the conflict index system 270 may receive the road frustration index dataset 266. As detailed above and illustrated in FIG. 8A, the road frustration index dataset 266 may be calculated based on the level of frustration corresponding to the route and the frustration information from the driver. In some cases, the frustration index dataset 266 may include demographic information, telematics information, and the like associated with the user, along with frustration information solicited or otherwise received from the user when calculating or predicting a frustration index value.

At 990, the conflict index system 270 and conflict index engine 271A may calculate a risk-response readiness dataset 272. The conflict index system 270 and conflict index engine 271A may utilize machine learning and weighted equation modeling with the inputs of the driver-risk score dataset 256, the driver-contextual risk score dataset 261, and the road frustration index dataset 266.

Moving back to FIG. 9A, at 930, the conflict index system 270 and conflict index engine 271A may calculate a driver-contextual risk score dataset 261. In some cases, the conflict index system 270 and conflict index engine 271A may utilize machine learning and weighted equation modeling with the inputs of the risk-response readiness dataset 272 and the contextual response score dataset 274.

The overall driving risk index values and other risk datasets described above may be utilized in various methods, such as generalized autonomous or ADAS systems to give variation for multiple users and personalization. Additionally, the overall driving risk index values and other risk datasets described above may be utilized for insurance applications, such as driving coaching and pricing.

For example, the overall driving risk index values and other risk datasets described above may be variables in a multivariate model of insurance losses, frequencies, severities, and/or pure premiums. Interactions of the variables would also be considered. The coefficient the model produces for each variable (along with the coefficient for any interaction terms) would be the value to apply to each subjective risk type.

In another embodiment: the insurance policy may be sold and priced in part based on where a customer falls within a three sigma distribution of risk units consumed by all insured per a typical policy period. The policy pricing may be based on an initial assumption of risk (e.g., risk due to overall driving risk index value, objective risks, subjective risks, etc.) to be consumed in the prospective policy period or may be based on subjective risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 114 that may automatically bill or deduct the cost from an account.

In some cases, the systems (such as the driver score system 250, the driver-contextual risk score system 260, the conflict index system 270) and the engines (such as the driver score engine 251A, the driver-contextual risk score engine 261A, the real-time driver risk score engine 262A, the conflict index engine 271A, and the risk-response readiness engine 272A), may utilize machine learning and weighted modeling to generate the scores and indexes. As used herein, machine learning may include generating one or more models using data from the example datasets (such as the driving behavior dataset 252, the risk-exposure dataset 254, the driver-risk dataset 256, the driver characteristics dataset 258, the driver score dataset 251, the real-time driver risk score dataset 262, the contextual information dataset 264, the road frustration index dataset 266, the driver-contextual risk score dataset 261, the current driving behaviors dataset 263, the trip dynamics dataset 265, the risk-response readiness dataset 272, the contextual response score dataset 274, and the conflict index dataset 271) and one or more algorithms. In some examples, supervised machine learning is utilized, wherein the one or more generated models are presented with inputs and outputs, and the machine learning algorithm determines one or more general rules to map the inputs to outputs. For example, a subset of the data from the datasets may be used as input data and data during and/or immediately after past events may be identified as the output. From these inputs and output (i.e., a training data set), the machine learning algorithms may be able to map indications of a vehicle collision to a determination that a vehicle is involved in or about to be involved in an event. In such examples, the machine learning algorithms may be able to predict an event is about to occur in future situations or the likelihood an event will occur in future situations. Of course, other data may be applied as inputs/outputs such as data from some or all of a trip, speed of vehicles, environmental conditions, time of the day, location of vehicles, vehicle control status information, driver behavior information, vehicle on-board telematics data, or any combination thereof.

Machine learning may be applied, as disclosed herein, to identify specific conditions that lead to events from a vehicle's perspective. Predictive behaviors may be determined to avoid and/or reduce the severity of future events. For example, the example machine learning algorithms may be "trained" with camera feeds and/or image recognition data corresponding to previous vehicle collisions and/or one or more vehicle collision simulations, with high accuracy, that an event (e.g., accident) is about to occur and/or is occurring in order to avoid and/or reduce the severity of the event. Additionally, expert-based modeling may be applied as well (sometimes weights can be hand-made and entered).

In some cases, a logistic-regression based model for risk classification may be utilized for any or all of the systems (such as the driver score system 250, the driver-contextual risk score system 260, the conflict index system 270) and risk engines (such as the driver score engine 251A, the driver-contextual risk score engine 261A, the real-time driver risk score engine 262A, the conflict index engine 271A, and the risk-response readiness engine 272A) according to aspects of this invention. The logistic-regression based model may utilize factors (independent variables): x1, x2, x3; binary dependent variables: y—no-risk (0) and risk (1); and interactive-quadratic factors: x1x2, x1x3, x2x3. An exemplary model may be y(0 or 1)—f x1, x2, x3, x1x2, x1x3, x2x3) (with more data these interactions can be of higher order). This method is utilized to be able to interpret the model (function f), thereby understanding and quantifying how driver-environment interactions (second-order interaction) affect risk. Logistic regression or decision tree which gives the weightage of important features may be good for initial analysis to understand risk. But, eventually, given the amount of data, the systems may employ other machine learning or deep learning methods.

In other cases according to aspects of this invention, the scoring system may be designed as hierarchical system where one layer feeds into the other metric and each of these metrics are obtained according to the convenience and application for all scores determined by systems (such as the driver score system 250, the driver-contextual risk score system 260, the conflict index system 270) and risk engines (such as the driver score engine 251A, the driver-contextual risk score engine 261A, the real-time driver risk score engine 262A, the conflict index engine 271A, and the risk-response readiness engine 272A). The metrics may be calculated in two ways: off-line after acquired all the data or on-line as the driver is driving. The on-line knowledge may be used to update the status of the off-line metric.

There is no mention of scene catalog where we devise a scene configuration+driving behaviors list to understand risk at various locations and times personalized to the driver and in general While this disclosure has been described with respect to specific examples including presently exemplary modes of carrying out this disclosure, those skilled in the art will appreciate that there are numerous variations and permutations of the above-described systems and techniques that fall within the spirit and scope of this disclosure.

We claim:

1. A vehicle control system including:
   one or more sensors configured to collect vehicle telematics data associated with a vehicle; and
   a computing device comprising:
   one or more processor and a non-transitory memory unit storing computer-executable instructions, which when executed by the one or more processor, cause the vehicle control system to:
   receive the vehicle telematics data from the one or more sensors;
   determine scene-configuration information including at least one of a number of surrounding vehicles, a lane dynamic, or a traffic dynamic;
   receive contextual information, the contextual information including at least one of a number of autonomous vehicles, a number of human drivers, a number of pedestrians, or a risk map score;
   calculate a contextual response score dataset using the scene-configuration information and the contextual information;
   calculate a conflict index dataset using the contextual response score dataset and a risk-response readiness dataset; and
   perform an autonomous driving action based at least partly on the conflict index dataset.

2. The vehicle control system of claim 1, wherein the vehicle telematics data includes a speed of the vehicle.

3. The vehicle control system of claim 1, wherein the one or more processor and a non-transitory memory unit storing computer-executable instructions, which when executed by the one or more processor, further cause the vehicle control system to identify one or more driving behaviors that include at least one of an irregular driving pattern, a risky acceleration, or following a vehicle.

4. The vehicle control system of claim 1, wherein the one or more processor and a non-transitory memory unit storing computer-executable instructions, which when executed by the one or more processor, further cause the vehicle control system to calculate, using a machine learning system, a real-time driver score dataset associated with a current driving behaviors dataset, and the autonomous driving action is based at least partly on the real-time driver score dataset.

5. The vehicle control system of claim 1, wherein the one or more processor and a non-transitory memory unit storing computer-executable instructions, which when executed by the one or more processor, further cause the vehicle control system to calculate a driving behavior score dataset from the vehicle telematics data, and the autonomous driving action is based at least partly on the driving behavior score dataset.

6. The vehicle control system of claim 1, wherein the one or more processor and a non-transitory memory unit storing computer-executable instructions, which when executed by the one or more processor, further cause the vehicle control system to determine, using a risk prediction model, a risk-exposure score dataset from a historical database storing accident information, traffic data, vehicle volume data, vehicle density data, road characteristic data, or weather data, and the autonomous driving action is based at least partly on the risk-exposure score dataset.

7. The vehicle control system of claim 1, wherein the one or more processor and a non-transitory memory unit storing computer-executable instructions, which when executed by the one or more processor, further cause the vehicle control system to calculate, in near real-time and based on the vehicle telematics data, a level of frustration associated with a driver of the vehicle, and the autonomous driving action is based at least partly on the level of frustration.

8. The vehicle control system of claim 1, wherein the one or more processor and a non-transitory memory unit storing computer-executable instructions, which when executed by the one or more processor, further cause the vehicle control system to calculate a road frustration index dataset from a level of frustration of a driver, and the autonomous driving action is based at least partly on the road frustration index dataset.

9. The vehicle control system of claim 1, wherein the autonomous driving action includes at least one of an evasive braking action or an evasive steering action.

10. A vehicle control system including:
a telematics device configured to collect telematics data associated with a vehicle; and
a computing device comprising:
one or more processor and a non-transitory memory unit storing computer-executable instructions, which when executed by the one or more processor, cause the vehicle control system to:
receive the telematics data;
determine scene-configuration information associated with a trip of the vehicle;
receive contextual information, the contextual information including at least one of a number of autonomous vehicles, a number of human drivers, a number of pedestrians, or a risk map score;
calculate a contextual response score dataset using the scene-configuration information and the contextual information;
calculate, via a machine learning system, a conflict index dataset using the contextual response score dataset and a risk-response readiness dataset; and
perform an autonomous driving action based at least partly on the conflict index dataset.

11. The vehicle control system of claim 10, wherein the computer-executable instructions, when executed by the one or more processor, further cause the vehicle control system to receive event-related data associated with the trip of the vehicle, the event-related data indicates at least one of an impact to a part of the vehicle, an airbag deployment, a hard turning event, a hard braking event, or an extended traffic slowdown.

12. The vehicle control system of claim 10, wherein the computer-executable instructions, when executed by the one or more processor, further cause the vehicle control system to calculate, using a machine learning system, the risk-response readiness dataset associated with a driver-risk score dataset, a driver-contextual risk score dataset, or a road frustration index dataset, and performing the autonomous driving action is based at least partly on the risk-response readiness dataset.

13. The vehicle control system of claim 10, wherein the computer-executable instructions, when executed by the one or more processor, further cause the vehicle control system to calculate and determine an overall driving risk index value using a risk-predictive modeling system that uses a driver score dataset, a driver-contextual risk score dataset, and the conflict index dataset, and performing the autonomous driving action is based at least partly on the overall driving risk index value.

14. A method of autonomous vehicle control, the method including:
collecting telematics data using a telematics device associated with an autonomous vehicle;
receiving the telematics data at a computing device of the autonomous vehicle, the computing device including one or more processor and a non-transitory memory unit storing computer-executable instructions;
determining scene-configuration information associated with a trip of the autonomous vehicle;
receiving contextual information, the contextual information including at least one of a number of autonomous vehicles, a number of human drivers, a number of pedestrians, or a risk map score;
calculating a contextual response score dataset using the scene-configuration information and the contextual information;
calculating a conflict index dataset using the contextual response score dataset and a risk-response readiness dataset; and
performing an autonomous driving action based at least partly on the conflict index dataset.

15. The method of claim 14, further comprising calculating a driver-risk score dataset based on a weighted average of a driving behavior score dataset and a risk-exposure score dataset, performing the autonomous driving action is based at least partly on the driver-risk score dataset.

16. The method of claim 14, further comprising calculating, using a machine learning system, a driver-contextual risk score associated with a contextual information dataset, a road frustration index dataset, or a real-time driver score dataset, and performing the autonomous driving action is based at least partly on the driver-contextual risk score.

17. The method of claim 14, wherein performing the autonomous driving action includes providing, with an autonomous vehicle control system, a driver system hand-off.

* * * * *